United States Patent
Ban

(10) Patent No.: US 7,239,350 B2
(45) Date of Patent: Jul. 3, 2007

(54) IMAGE PICK-UP DEVICE AND SYSTEM THAT PROVIDE IMAGE TAKING GUIDANCE

(75) Inventor: Shinichi Ban, Sakai (JP)

(73) Assignee: Minolta Co., Ltd., Osaka (JP)

( * ) Notice: Subject to any disclaimer, the term of this patent is extended or adjusted under 35 U.S.C. 154(b) by 573 days.

(21) Appl. No.: 10/102,051

(22) Filed: Mar. 19, 2002

(65) Prior Publication Data

US 2004/0201741 A1    Oct. 14, 2004

(30) Foreign Application Priority Data

Mar. 21, 2001  (JP)  ............................ P2001-080621

(51) Int. Cl.
*H04N 5/222* (2006.01)
*H04N 5/76* (2006.01)
*G06F 17/00* (2006.01)

(52) U.S. Cl. .............................. 348/333.02; 348/231.3; 715/709

(58) Field of Classification Search ........... 348/333.02, 348/231.3, 231.2, 231.5, 231.6, 333.01, 333.04, 348/333.05, 333.11, 333.12; 345/709, 705, 345/707; 382/167, 255, 311; 715/709, 705, 715/707

See application file for complete search history.

(56) References Cited

U.S. PATENT DOCUMENTS

| 5,727,234 | A |   | 3/1998  | Sakagami et al. ............ 396/52 |
| 5,873,007 | A | * | 2/1999  | Ferrada Suarez ........... 396/296 |
| 5,943,516 | A |   | 8/1999  | Uchiyama et al. .......... 396/281 |
| 6,101,332 | A |   | 8/2000  | Satoh .......................... 396/52 |
| 6,304,284 | B1| * | 10/2001 | Dunton et al. ................. 348/36 |
| 6,377,294 | B2| * | 4/2002  | Toyofuku et al. ............. 348/36 |
| 6,606,117 | B1| * | 8/2003  | Windle ........................ 348/239 |
| 6,608,650 | B1| * | 8/2003  | Torres et al. .......... 348/333.02 |
| 6,778,217 | B1| * | 8/2004  | Nishimura ............. 348/333.12 |
| 6,806,906 | B1| * | 10/2004 | Soga et al. ............ 348/333.03 |
| 6,972,792 | B2| * | 12/2005 | Dow et al. ............... 348/231.6 |
| 7,106,375 | B2| * | 9/2006  | Venturino et al. ...... 348/333.02 |
| 2002/0105582 | A1 | * | 8/2002 | Ikeda ...................... 348/231.3 |
| 2003/0206240 | A1 | * | 11/2003 | Hyodo et al. .......... 348/333.03 |
| 2004/0165085 | A1 | * | 8/2004 | Shibutani ................ 348/231.3 |
| 2006/0055805 | A1 | * | 3/2006 | Stockton et al. ....... 348/333.01 |
| 2006/0146167 | A1 | * | 7/2006 | Aizawa et al. ......... 348/333.01 |
| 2006/0164536 | A1 | * | 7/2006 | Abe ....................... 348/333.01 |

FOREIGN PATENT DOCUMENTS

| JP | 11-215408 (A)   | 8/1999  |
| JP | 2000-253299 (A) | 9/2000  |
| JP | 2000-333045 (A) | 11/2000 |
| JP | 2002-0077691 (A)| 3/2002  |
| JP | 2004128878 A * | 4/2004  |

* cited by examiner

Primary Examiner—John M. Villecco
(74) Attorney, Agent, or Firm—Sidney Austin LLP

(57) ABSTRACT

The objective of the present invention is to achieve an image-pickup device which, when the user picks up an image of a subject using the image-pickup device, makes it possible to reduce a failure relating to framing techniques and image-pickup techniques. Guide information relating to framing techniques or image-pickup techniques is preliminarily stored in the image-pickup device, and during an image-pickup mode, guide information suitable for the subject is displayed for the user. The guide information includes sample images, GS, etc., and the user is allowed to carry out framing by reference to this displayed image at the time of picking up an image; thus, it becomes possible to reduce a failure in picking up an image.

14 Claims, 16 Drawing Sheets

FIG.21

TAG INFORMATION

ID OF GUIDE INFORMATION

IMAGE DATA

IMAGE PICK-UP DEVICE AND SYSTEM THAT PROVIDE IMAGE TAKING GUIDANCE

This application is based on application No. 2001-080621 filed in Japan, the contents of which are hereby incorporated by reference.

BACKGROUND OF THE INVENTION

1. Field of the Invention

The present invention relates to an image-pickup device for picking up an image of a subject.

2. Description of the Background Art

Conventionally, in image-pickup devices, techniques, such as automatic focusing control (AF control), automatic exposing control (AE control) and white balance adjustment (WB adjustment), have been adopted so that, among user's failures in picking up an image of a subject by using an image-pickup device, those failures in image quality, such as picked-up images under a non-focused state and picked-up images under an insufficient exposure, can be prevented beforehand by using the above-mentioned automatic focusing control or the like.

Moreover, in particular, in the case when a digital camera is used as the image-pickup device, since image data is obtained as a result of an image-pickup, it is possible to cover a failure in image quality at the time of an image-pickup operation later by using an image processing operation.

However, in conventional image-pickup devices, with respect to failures in how to pick up an image, such as how to frame a subject or how to position a subject or what posture the subject should take, no measures are available to save such failures.

SUMMARY OF THE INVENTION

The present invention concerns an image-pickup device for picking up an image of a subject.

In the present invention, the image-pickup device is provided with the following units: an informing unit for giving desired information to the user; and a controller which, in an image-pickup mode, gives guide information relating to framing techniques or image-pickup techniques that is suitable for a subject to the informing unit so as to allow the guide information to be informed.

With this invention, in the image-pickup mode, guide information relating to framing techniques or image-pickup techniques that is suitable for a subject is given to the user so that it becomes possible to reduce failures in picking up images relating to framing techniques and image-pickup techniques.

Moreover, in one aspect of the present invention, the image-pickup device is further provided with: a storing unit for storing a plurality of pieces of the guide information; and a selection unit for selecting one piece of guide information from the pieces of the guide information, and the controller gives the guide information selected by the selection unit to the informing unit so as to allow the guide information to be informed.

In this aspect, since the user is informed of the guide information selected by the selection unit, it is possible to reduce failures in picking up images relating to framing techniques and image-pickup techniques.

In still another aspect of the present invention, each of the plurality of pieces of guide information is made in association with image-pickup parameters related to image-pickup conditions at the time of picking up an image, and the controller gives the guide information selected by the selection unit to the informing unit so that the guide information is informed, and sets the image-pickup conditions based upon the image-pickup parameters related to the guide information selected by the selection unit.

In accordance with this aspect, since the user is informed of the guide information selected by the selection unit, and since the image-pickup conditions are set based upon the image-pickup parameters related to the guide information selected by the selection unit, it is not necessary for the user to set the image-pickup conditions at the time of picking up an image.

Moreover, in still another aspect of the present invention, the informing unit is provided with a first display unit for displaying a desired image.

This aspect allows the user to visually confirm the guide information.

Furthermore, in still another aspect of the present invention, the controller displays an image relating to a subject on the first display unit, and also displays the guide information at one area of the first display unit so as to allow the guide information to be informed.

In accordance with this aspect, the image relating to a subject is displayed on the first display unit, while the guide information is displayed at one area of the first display unit so as to allow the guide information to be informed; therefore, the user is allowed to visually confirm both of the image relating to a subject and the guide information so that it becomes possible to reduce failures in picking up images relating to framing techniques and image-pickup techniques.

In still another aspect of the present invention, the informing unit is further provided with a second display unit having a display size smaller than the first display unit, and the controller selectively allows one of the first display unit and the second display unit to display the guide information.

In accordance with this aspect, since the guide information is displayed on the display unit used for framing at the time of picking up an image, it becomes possible to reduce failures in picking up images relating to framing techniques and image-pickup techniques.

Moreover, in still another aspect of the present invention, the image-pickup device is further provided with: an image processor which, in accordance with the guide information that has been informed prior to an image-pickup process, carries out an image processing on the image resulting from the image-pickup process.

In this aspect, in accordance with the guide information that has been informed prior to an image-pickup process, an image processing is carried out on the image resulting from the image-pickup process; therefore, it becomes possible to carry out an image processing suitable for the situation at the time of picking up an image.

Moreover, in still another aspect of the present invention, the guide information related to framing techniques is information that gives instructions as to which direction an image should be picked up from with respect to a subject, and the guide information related to image-pickup techniques is information that gives instructions as to how to place or direct a subject with respect to the image-pickup device.

This aspect allows the user to visually confirm techniques as to which direction an image should be picked up from and how to place or direct a subject, at the time of picking up an image, thereby making it possible to reduce failure in picking up an image.

Moreover, this invention also relates to an information supplying system, which has an information supplying device and a communication terminal device that are connected to each other in a mutually communicatable state with the communication terminal device being connected to an image-pickup device in a mutually data exchangeable state through a cable or radio or a predetermined recording medium.

In this invention, the information supplying device is provided with a storing unit for storing guide information related to framing techniques or image-pickup techniques in accordance with a subject; the image-pickup device is provided with an informing unit for giving desired information to the user, and a controller which gives the guide information to the informing unit so as to allow the guide information to be informed; and the controller gives the guide information acquired from the information supplying device through the communication terminal device to the informing unit so as to allow the guide information to be informed.

Moreover, in another aspect, the information supplying device is provided with a storing unit for storing guide information related to framing techniques or image-pickup techniques in accordance with a subject; the image-pickup device comprises an informing unit for giving desired information to the user and a controller which gives the guide information to the informing unit so as to allow the guide information to be informed; and the controller gives the guide information acquired from the information supplying device to the informing unit so as to allow the guide information to be informed.

In accordance with these information supplying systems, since the image-pickup device is allowed to acquire the guide information from the information supplying device, it becomes possible to reduce failures in picking up images relating to framing techniques and image-pickup techniques, at the time of picking up an image by using the image-pickup device.

Moreover, this invention also relates to an information supplying device, which is capable of exchanging data with an image-pickup device through a cable or radio or a predetermined recording medium, comprising.

In this invention the information supplying device is provided with the following units: a storing unit which stores a plurality of kinds of guide information for respective models of the image-pickup device, the guide information being related to framing techniques or image-pickup techniques suitable for a subject, used at the time of picking up an image by using the image-pickup device; a model identifying unit which identifies a model of the image-pickup device that is capable of exchanging data with the information supplying device at the time of transmitting the guide information; a guide information extracting unit which extracts the guide information from the storing unit based upon the model of the image-pickup device that has been identified by the model identifying unit; and a transmitting unit for transmitting the guide information extracted by the guide information extracting unit to the image-pickup device.

In accordance with this invention, it becomes possible to supply guide information suitable for each model of an image-pickup device to the image-pickup device.

As described above, the objective of the present invention is to provide an image-pickup device which makes it possible to reduce failures in picking up images relating to framing techniques and image-pickup techniques, when the user picks up an image by using the image-pickup device, and also to provide an information supplying device and an information supplying system for supplying information to the image-pickup device.

These and other objects, features, aspects and advantages of the present invention will become more apparent from the following detailed description of the present invention when taken in conjunction with the accompanying drawings.

BRIEF DESCRIPTION OF THE DRAWINGS

FIG. 21 is a drawing that shows a data structure of a picked-up image (image file).

DESCRIPTION OF THE PREFERRED EMBODIMENTS

Referring to Figures, the following description will discuss preferred embodiments of the present invention. Here, in the following description, an explanation will be given of a digital camera as one example of an image-pickup device.

<1. Construction of Digital Camera>

Figure 1:
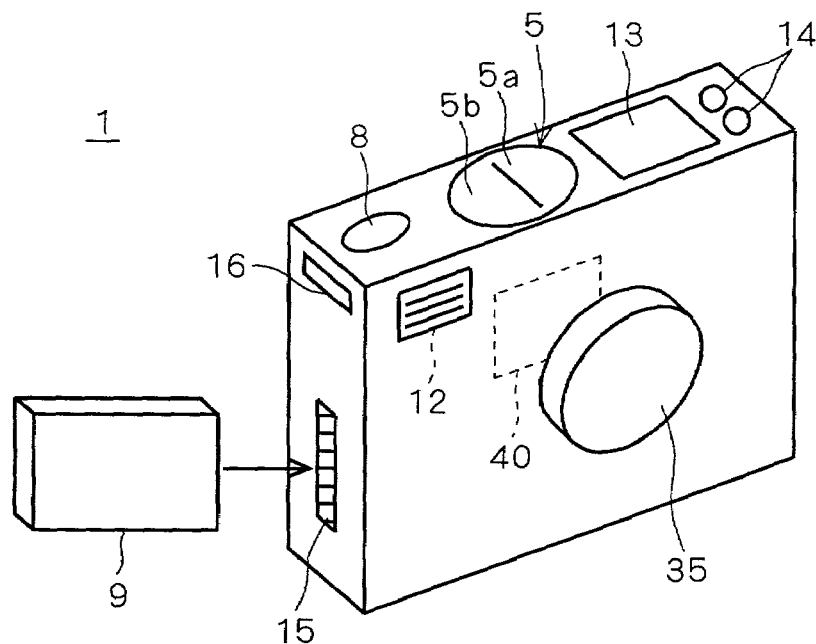
FIG. 1 is a perspective view showing a digital camera.
Figure 2:
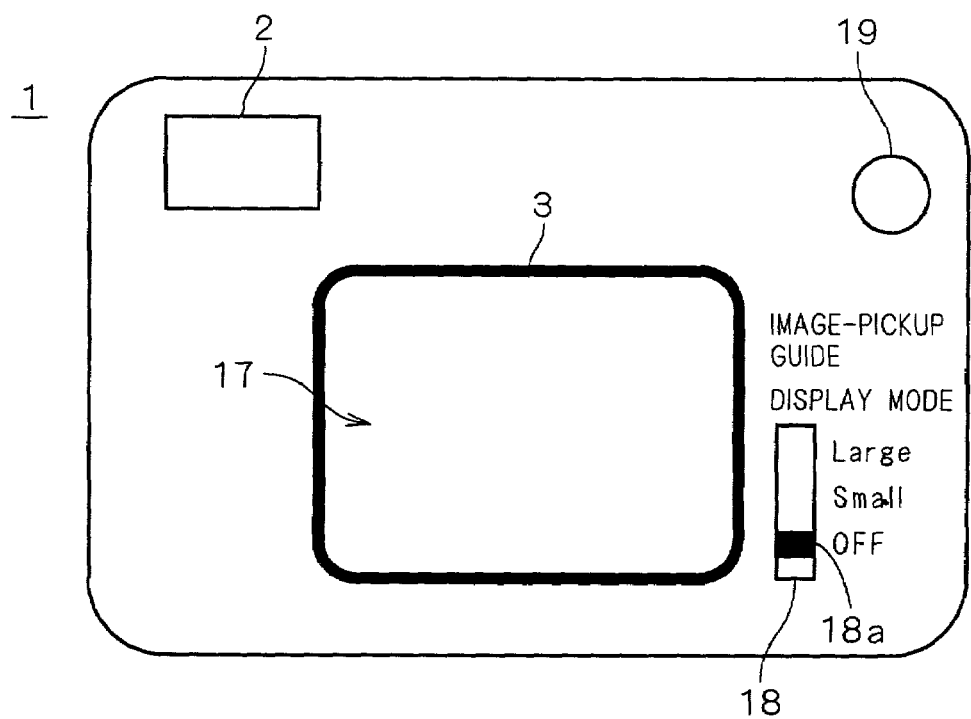
FIG. 2 is a drawing that shows a structure on the back-face side of a digital camera.

First, an explanation will be given of a digital camera 1. FIG. 1 is a perspective view that shows a digital camera. Further, FIG. 2 is a drawing that shows a construction of the back-face side of the digital camera 1. As shown in FIG. 1, an image-pickup lens 35 and a flash light-emitting unit 12 are placed on the front-face side of the digital camera 1. Inside the image-pickup lens 35 are installed CCD image-pickup elements 40 that serve as image-pickup means for photoelectric-converting a subject image obtained through image-pickup lens 35.

Moreover, on the upper face side of digital camera 1 are placed a release button 8, a zoom lever 5 for carrying out an optical zooming operation, a camera state displaying device 13 and an image-pickup condition setting switch 14. Release button 8 is a button which is pushed by the user when a subject image is picked up. Here, the zoom lever 5 is provided with two buttons, that is, an enlarging button (left button) 5*a* and a reducing button (right button) 5*b*, so that, by operating either one of enlarging button 5*a* and reducing button 5*b*, the user is allowed to optically change the size of a subject image to be converged on CCD image-pickup elements 40. Moreover, this zoom lever 5 is also used when the magnification of an image to be enlarged is set by using an electronic zooming function, which will be described later.

Camera state display device 13 is constituted by, for example, a liquid crystal display of a segment display-type, and placed so as to indicate the contents of current settings in digital camera 1 to the user. Moreover, image-pickup condition setting switch 14 is a switch that is used when the operation mode in digital camera 1 is switched and set to "image-pickup mode" and "reproducing mode" through manual operations.

The image-pickup mode includes a macro mode for setting image-pickup parameters suitable for picking up an image of a subject in a short range, a personal mode for setting image-pickup parameters suitable for normal image-picking-up operations for persons, etc., and a sport mode that is suitable for picking up images of a subject that moves swiftly; thus, these settings can be manually set through image-pickup condition setting switch 14. These macro mode, person mode and sport mode are used for setting image-pickup parameters depending on various image-pickup operations, and different from an image-pickup guide display mode, which will be described later.

Moreover, on a side face portion of digital camera 1, an attaching section 15 to which a memory card 9 that is a recording medium for recording image data, etc. is attached is formed so that an exchangeable memory card 9 is inserted therein. Moreover, on a side face portion of digital camera 1, a communication interface 16, which makes a connection to a computer or a communication device or the like so as to mutually carry out data communication, is installed so that, when a predetermined communication cable is connected to communication interface 16, it becomes possible to carry out data communication with other external devices.

Furthermore, on the rear face side of digital camera 1, a liquid crystal display 3 serving as a first display unit with a plurality of pixels for displaying a desired image and a finder window 2 are placed. This liquid crystal display 3 can display any other desired image in addition to an image obtained by the CCD image-pickup elements 40. Moreover, on an inner side of finder window 2, a finder-use small-size liquid crystal display (a liquid crystal display 2*a* inside a finder, which will be described later) serving as a second display unit is integrally installed so that it can display any other desired image in addition to an image obtained by the CCD image-pickup elements 40.

Therefore, in the case when a subject image is picked up by using digital camera 1, the subject is confirmed by a so-called live-view display in which an image that is obtained by successively photoelectric-converting the subject image is displayed on liquid crystal display 3, and the subject is also confirmed by carrying out the live-view display on the liquid crystal display that is placed on the inner side of finder window 2 and that has a size smaller than liquid crystal display 3.

A touch panel sensor 17 is placed on the screen of liquid crystal display 3, and the user is also allowed to carry out input operations through touch panel sensor 17 in addition to operations carried out by using the above-mentioned various switches.

Moreover, on the back-face side of the digital camera 1, an image-pickup guide display mode operation unit 18 for making a selection as to whether or not guide information is displayed on the liquid crystal display 3 upon picking up an image of a subject is installed. The image-pickup guide display mode is a mode for displaying guide information so as to give instructions as to how to pick up an image in an appropriate state in general at the time of the image-pickup mode.

Here, the guide information may be displayed on the small-size liquid crystal display within finder window 2, or on liquid crystal display 3 on the back-face of digital camera 1. As to whether the guide information is displayed on the small-size liquid crystal display within finder window 2 or on liquid crystal display 3, the user can select by operating a liquid crystal display switching button 19, and digital camera 1 displays the guide information on the corresponding display device selected by the user operation. In this manner, the guide information is displayed on either one of the small-size liquid crystal display within finder window 2 and liquid crystal display 3; thus, the guide information can be displayed on the display device that is used as framing when the user picks up an image, and since the other display is set to an off state so that it is possible to save power. Here, the following explanation will mainly describe a case in which the guide information is displayed on liquid crystal display 3.

Moreover, a switch 18*a* is placed on image-pickup guide display mode operation unit 18. The user can set the switch 18*a* at a desired position among the upper position, the middle position and the lower position. In the case of the settings on the upper position and the middle position, the image-pickup guide display mode is set to the on-state. In the case of the upper position (large), the guide information is full-screen displayed on liquid crystal display 3. Moreover, in the case of the middle position (small), the guide information is displayed on one area of liquid crystal display 3. Therefore, in the case of the setting at the middle position, the guide information having an image size smaller than the full-screen display at the time of the upper position is displayed. Moreover, in the case of the setting at the lower position (off), the image-pickup guide display mode is turned off to provide a normal image-pickup mode without the display of the guide information.

Figure 3:
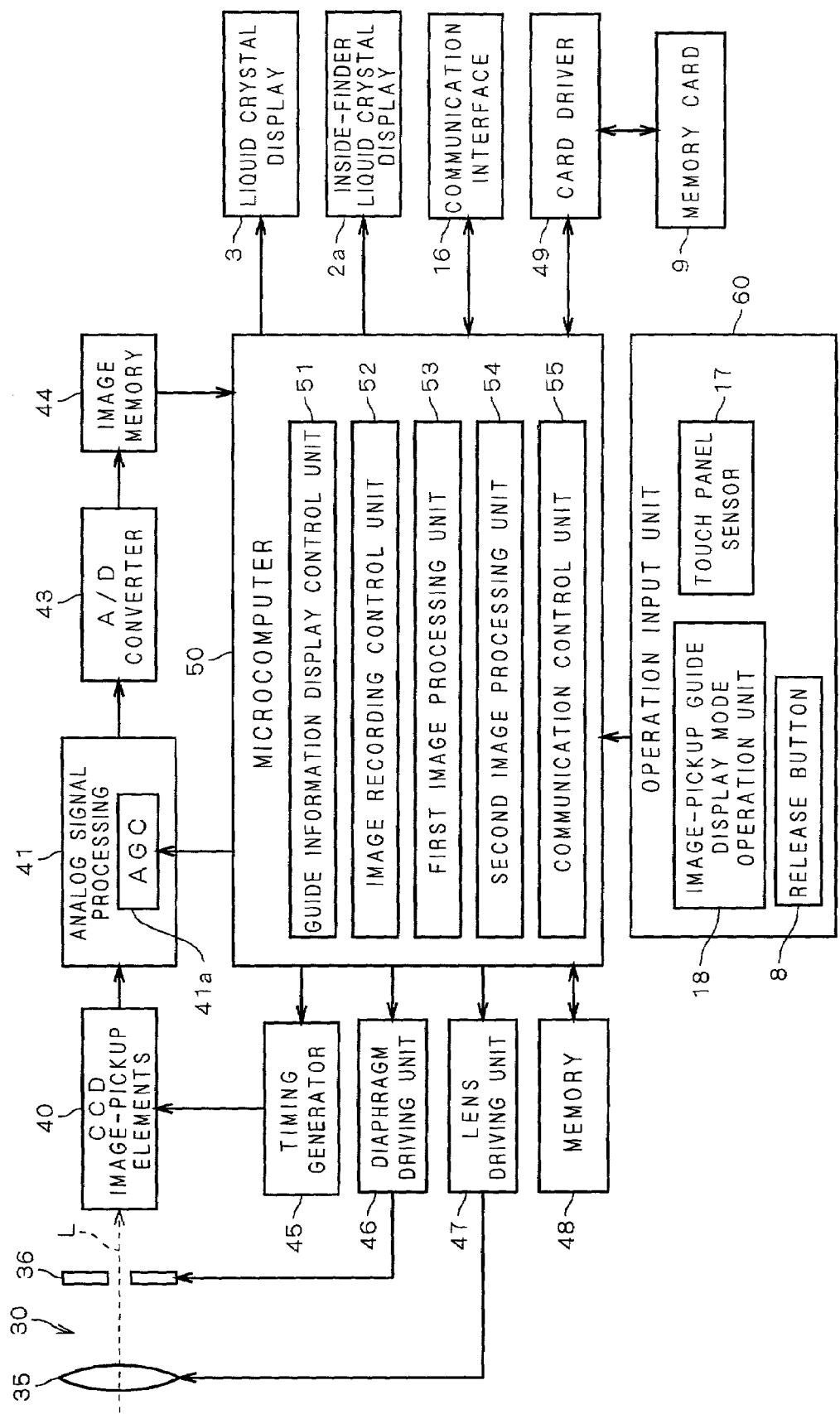
FIG. 3 is a block diagram that shows an inner construction of the digital camera.

Next, an explanation will be given of an inner construction of digital camera 1. FIG. 3 is a block diagram that shows the inner construction of digital camera 1.

As shown in FIG. 3, an image-pickup optical system 30 is provided with an image-pickup lens 35 and a diaphragm plate 36, and image-pickup optical system 30 is arranged so as to direct a subject image to CCD image-pickup elements 40. Image-pickup lens 35 is driven by a lens driving unit 47 so that the magnification of a subject image converged on CCD image-pickup elements 40 is variably changed. Moreover, diaphragm plate 36 is also driven by a diaphragm driving unit 46 so that the diaphragm state (aperture diameter) of diaphragm plate 36 is variably changed. Moreover, diaphragm driving unit 46 and lens driving unit 47 are arranged so as to drive diaphragm plate 36 and image-pickup lens 35 based upon control signals given by a microcomputer 50.

CCD image-pickup elements 40, which serve as an image-pickup means having a plurality of pixels on a surface perpendicular to the light axis L, carries out a photoelectric conversion on a subject image converged by the optical system to form an image signal (a signal consisting of signal trains of pixel signals that have been light-received by each pixel) having color components of R(red), G(green) and B(blue), and outputs the resulting signal. These CCD image-pickup elements 40 are controlled in the charge storing time (more specifically, exposure start timing and exposure end timing) corresponding to the shutter speed, by a timing generator 45, thereby carrying out an image pickup operation. In CCD image-pickup elements 40, the output timing, etc. of charges accumulated by exposure are controlled by timing generator 45.

Timing generator 45 generates the above-mentioned driving control signals to CCD image-pickup elements 40 based upon a reference clock from microcomputer 50 functioning as a control means.

An analog signal processing circuit 41 carries out a predetermined analog signal process on an image signal (analog signal) obtained from CCD image-pickup elements 40. Analog signal processing circuit 41, which is provided with an AGC (automatic gain control) circuit 41a functioning as a gain adjusting means, is arranged in such a manner that microcomputer 50 adjusts the gain of AGC circuit 41a so that the level adjustment of the image signal is carried out. Here, analog signal processing circuit 41 is also provided with circuits such as a CDS (correlation double sampling) circuit which reduces noise of the image signal.

A/D converter 43 converts the respective pixel signals of an image signal obtained from analog signal processing circuit 41 to digital signals of, for example, 10 bits. A/D converter 43 converts the respective pixel signals (analog signals) to digital signals having a predetermined number of bits based upon an A/D conversion-use clock inputted from an A/D clock generation circuit, not shown.

An image memory 44 stores image data that have been converted to digital signals. This image memory 44 has a memory capacity corresponding to one frame.

Microcomputer 50, which is provided with a RAM and a ROM that store programs, variables, etc., therein, executes programs that have been preliminarily stored therein to achieve various functions. For example, microcomputer 50 controls functions of units, such as a guide information display control unit 51 for displaying guide information at the time of the image-pickup mode, an image recording control unit 52 for recording a picked-up image in a memory card 9, a first image-processing unit 53 for carrying out an image processing so as to enhance the reproducibility of an image, such as a white-balance adjustment and a γ-correction, a second image-processing unit 54 which carries out an image processing corresponding to an image-pickup scene or the like based upon information as to what guide information is referred to when the user picked up the image and a communication control unit 55 for carrying out data communication through an external device of digital camera 1 and a communication interface 16.

Microcomputer 50 can control a displayed image on liquid crystal display 3 and inside-finder liquid crystal display 2a located inside finder window 2 to be converted to a desired image, makes an access to communication interface 16 and a card driver 49, and also carries out data input-output operations through an external device and a memory card 9. Moreover, a memory 48 is installed in digital camera 1 so that data inputted by microcomputer 50 through communication interface 16 or data inputted through a memory card 9 can be stored and preserved in memory 48.

An operation input unit 60 is an operation input means including the above-mentioned release button 8, touch panel sensor 17, image-pickup guide display mode operation unit 18 and other operation units, and operation information inputted by the user is supplied to microcomputer 50 through operation input unit 60. Consequently, microcomputer 50 is allowed to carry out processes corresponding to the operations of the user; thus, for example, guide information is displayed on liquid crystal display 3 through the corresponding user operation at the time of the image-pickup mode.

<2. Guide Information>

Next, an explanation will be given of guide information. As described earlier, the guide information is information which is used for giving instructions as to how to pick up an image in an appropriate state in general at the time of the image-pickup mode, and includes an image, characters, etc. This guide information includes information related to framing techniques and information related to image-pickup techniques, and the guide information related to framing techniques is information as to which direction an image is picked up from with respect to a subject, and the guide information related to image-pickup techniques is information that gives instructions as to how to place or direct a subject with respect to digital camera 1.

Figure 4:
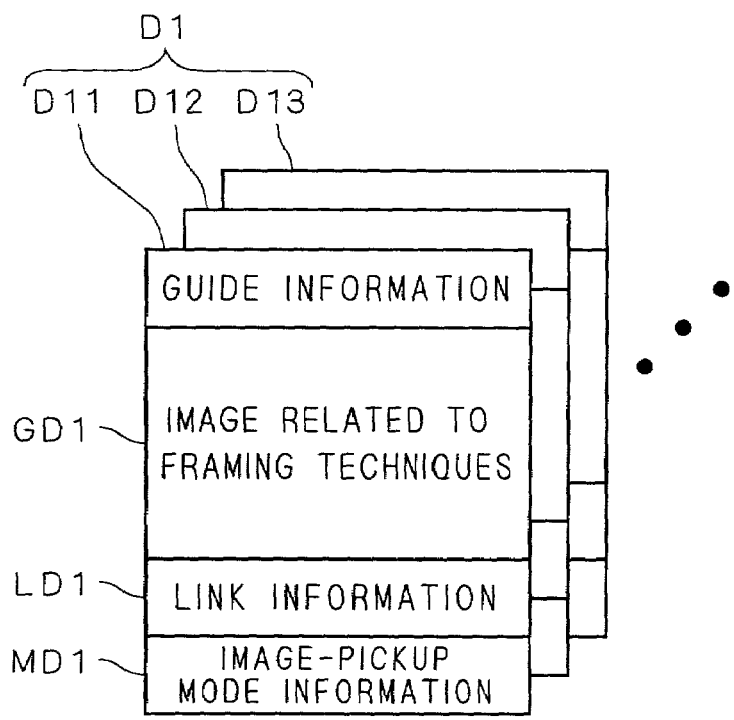
FIG. 4 is a drawing that shows a data structure of guide information.
Figure 5:
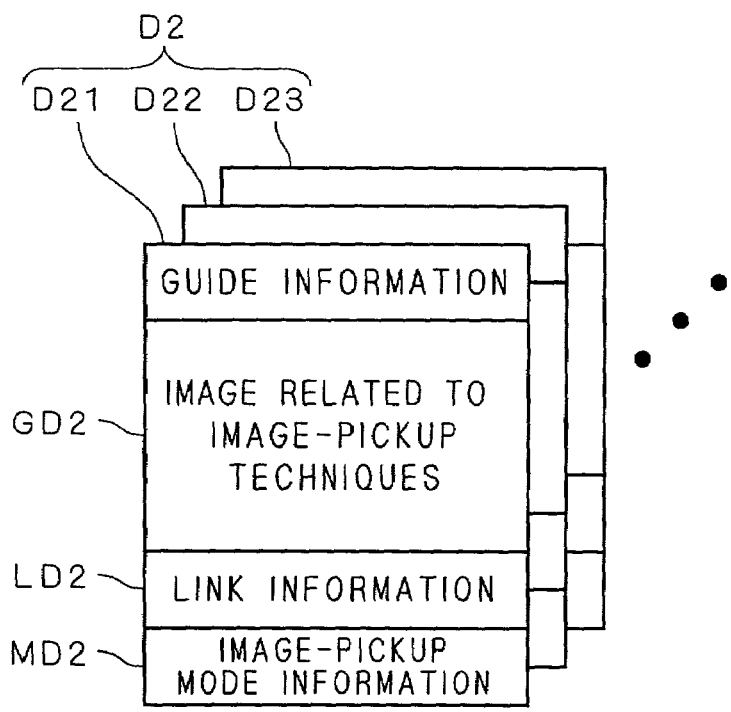
FIG. 5 is a drawing that shows a data structure of guide information.

FIGS. 4 and 5 are drawings that shows data structures of guide information, and FIG. 4 shows guide information group D1 in which pieces of guide information relating to framing techniques are associated with each other, and FIG. 5 shows guide information group D2 in which pieces of guide information relating to image-pickup techniques are associated with each other.

As illustrated in FIG. 4, guide information D11 related to framing techniques includes images GD1 related to framing techniques, link information LD1 and image-pickup mode information MD1, and a plurality of pieces of guide information D12, D13, . . . , each having the same data structure, are collected to form guide information group D1. In guide information group D1, a plurality of kinds of guide information D11, D12, . . . are compiled with each kind being associated with the same image-pickup target. For example, in the case when guide information group D1 is compiled based upon a theme "track and field", the corresponding guide information group D1 contains pieces of guide information D11, D12, . . . that are used for properly framing various competition events such as relay races. Here, even in the case of relay races, appropriate framing techniques are different depending on respective scenes, such as a moment of baton passing and a moment of reaching the finish line; therefore, each of the pieces of guide information D11, D12, ... forms guide information for giving instructions for an appropriate framing technique in accordance with a subject of each of the scenes.

Among pieces of guide information D11, the information used for giving instructions to the user as to framing techniques is image GD1 related to framing techniques, and link information LD1 is information for making this information associated with other pieces of guide information D12, D13, etc.

Link information LD1 is, for example, link information such as hyper text, and by referring to this link information LD1, the user is allowed to extract other pieces of guide information D12, D13, ... from one piece of guide information D11 contained in guide information group D1 based upon the user operation.

Image-pickup mode information MD1 provides parameters indicating which image-pickup mode among macro mode, person mode and sport mode should be set. In other words, image-pickup mode information MD1 and guide information D11 are associated with each other in such a manner that, by referring to image-pickup mode information MD1, the corresponding image-pickup parameters under the image-pickup conditions at the time of an image pickup are univocally found. Here, guide information D11 and image-pickup mode information MD1 do not necessarily have a one-to-one correspondence, and a plurality of pieces of guide information may have the same image-pickup mode information MD1.

Moreover, as shown in FIG. 5, guide information D21 related to image-pickup techniques contains image GD2 related to image-pickup techniques, link information LD2 and image-pickup mode information MD2, and a plurality pieces of guide information D22, D23, ..., each having the same data structure, are collected to form guide information group D2. In guide information group D2, a plurality of kinds of guide information D21, D22 ... are compiled with each kind being associated with the same image-pickup target. For example, in the case when guide information group D2 is complied based upon a theme "person", the corresponding guide information group D2 contains pieces of guide information D21, D22, ... that are used for properly shooting a person subject. Here, even in the case of person subjects, appropriate image-pickup techniques are different depending on respective subjects such as a man subject and a woman subject; for a typical example, in the case of a woman subject, a desired technique is to make her thinner in a picked up image, while in the case of a man subject, such an image-pickup technique is seldom desired. Therefore, each of the pieces of guide information D21, D22, ... forms guide information for giving instructions to the user as to suitable position and pose of a subject in accordance with the subject in each of the scenes.

Among pieces of guide information D21, the information used for giving instructions to the user as to image-pickup techniques is image GD2 related to image-pickup techniques, and link information LD2 is information for making this information associated with other pieces of guide information D22, D23, etc. By referring to this link information LD2, the user is allowed to extract other pieces of guide information D22, D23, ... from one piece of guide information D21 contained in guide information group D2 based upon the user operation. Image-pickup mode information MD2 provides parameters indicating which image-pickup mode among macro mode, person mode and sport mode should be set. In other words, image-pickup mode information MD2 and guide information D21 are associated with each other in such a manner that, by referring to image-pickup mode information MD2, the corresponding image-pickup parameters under the image-pickup conditions at the time of an image pickup are univocally found.

Figure 6:
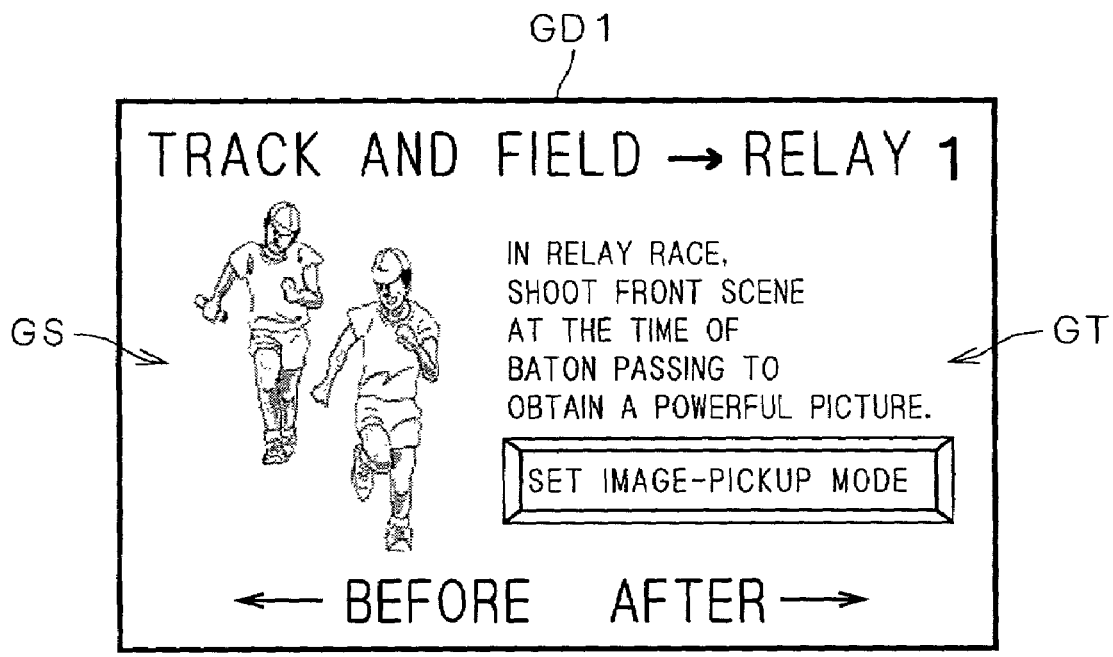
FIG. 6 is a drawing that shows one example of an image relating to framing techniques.

FIG. 6 is a drawing that shows one example of an image GD1 that relates to framing techniques. In the case when, for example, the user picks up an image of a relay race in a track meet, he or she allows digital camera 1 to display image GD1 as shown in FIG. 6 on liquid crystal display 3 with the image-pickup guide display mode being switched on. Image GD1 includes a sample image GS showing a specific scene and a guide sentence GT that indicates which direction the subject should be appropriately shot from, and upon picking up an image, the user refers to these pieces of information so that he or she is allowed to pick up the image from an appropriate direction.

The display of "Image-pickup mode setting" on image GD1 is displayed at a position corresponding to a sensor position of touch panel sensor 17, and the user operates touch panel sensor 17 so that microcomputer 50 automatically sets an image-pickup mode among the macro mode, person mode and sport mode, thereby automatically determining image-pickup parameters (shutter speed, a state of diaphragm, etc.) at the time of picking up an image. This automatic setting is carried out by microcomputer 50 based upon image-pickup mode information MD1 contained in guide information D11 currently being displayed thereon.

Moreover, displays "←before" and "after→" on image GD1 are also given at positions corresponding to the sensor position of touch panel sensor 17; thus, the user is allowed to change the contents of guide information to be displayed on liquid crystal device 3 to the contents of another subject by operating touch panel sensor 17. This change is made by guide information display control unit 51, which extracts other guide information D12, 13, etc. based upon link information LD1 contained in guide information D11 currently being displayed, and updates the contents of the display of liquid crystal display 3 based upon the extracted guide information. In this case, guide information display control unit 51 functions as a selection means for selecting one piece of guide information from a plurality of pieces of guide information based upon the operation of touch panel sensor 17.

Figure 7:
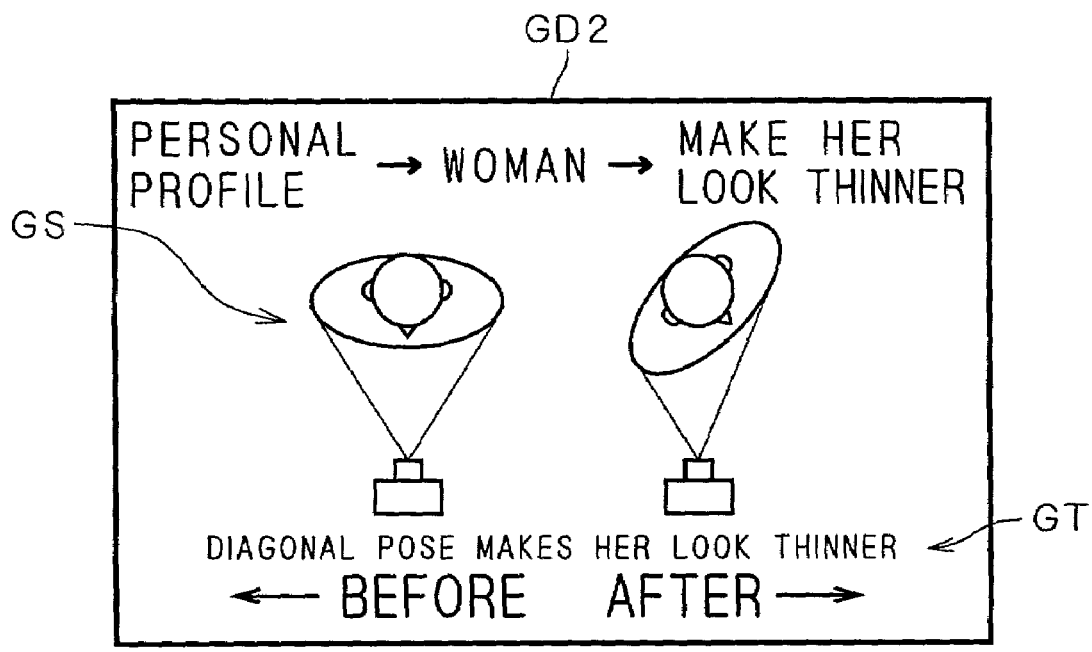
FIG. 7 is a drawing that shows one example of an image relating to image-pickup techniques.

Next, FIG. 7 is a drawing that shows one example of an image GD2 that relates to image-pickup techniques. For example, when the user picks up an image of a woman, he or she allows the digital camera 1 to display image GD2 as shown in FIG. 7 on liquid crystal display 3 with the image-pickup guide display mode being switched on. Image GD1 includes a sample image GD for giving instructions as to the position or posture of a subject and a guide sentence GT indicating how to place the subject or what posture the subject should take in order to pick up a desired image in general, and upon picking up an image, the user refers to these pieces of information so that he or she is allowed to pick up the image with the subject being placed at an appropriate position or having an appropriate posture.

Moreover, displays "←before" and "after→" on image GD2 are also given at positions corresponding to the sensor position of touch panel sensor 17, in the same manner as FIG. 6; thus, the user is allowed to change the contents of guide information to be displayed on liquid crystal device 3 to the contents of another subject by operating touch panel sensor 17. This change is made by guide information display control unit 51, which functions as a selection unit based upon the operation of touch panel sensor, and extracts other guide information D22, 23, etc. based upon link information LD2 contained in guide information D21 currently being displayed, and updates the contents of the display of liquid crystal display 3 based upon the extracted guide information.

The above-mentioned guide information and guide information groups may be preliminarily stored in memory 48 that functions as a storing unit; however, since, in general, a number of pieces of the above-mentioned guide information are prepared in accordance with the kinds and image-pickup scenes, etc. of the subject, to preliminarily store all the guide information groups corresponding to all subjects or all image-pickup scenes in memory 48 causes an increase in the capacity of memory 48, resulting in high costs in digital camera 1.

For this reason, in more preferable arrangement, at least one basic guide information group is preliminarily stored in memory 48 serving as a storing unit, and pieces of guide information other than the guide information included in the basic guide information group are obtained from an external apparatus on demand from the user.

<3. Construction of Information Supplying System>

An explanation will be given of an information supplying system 100 through which digital camera 1 obtains guide information.

Figure 8:
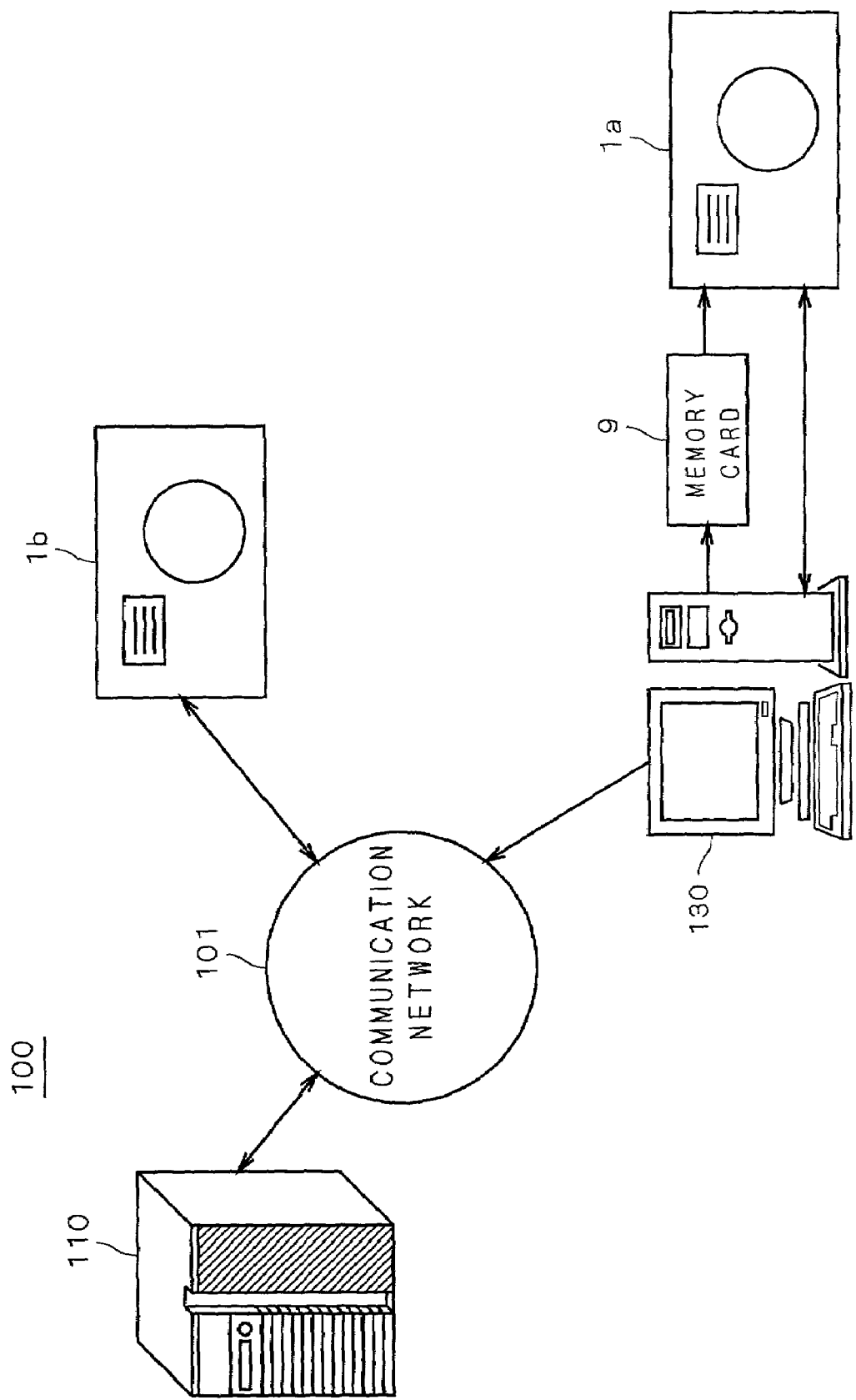
FIG. 8 is a drawing that shows a structural example of an information supplying system.

FIG. 8 is a drawing that shows a structural example of information supplying system 100. As shown in FIG. 8, information supplying system 100 is arranged so that guide information is transmitted to digital cameras 1a, 1b from an information supplying device 110 that stores a plurality of guide information groups through a communication network 101.

Digital cameras 1a, 1b are the same as the above-mentioned digital camera 1. Moreover, communication network 101 is a cable or radio transmission medium capable of data bi-directional communication, and includes public networks, such as the Internet and telephone lines, as well as local area networks. Communication terminal devices 130 are constituted by computers and mobile telephones, etc., and allowed to carry out data communication with information supplying device 110 through communication network 101.

Digital camera 1a is designed so that, when communication terminal device 130 acquires guide information from information supplying device 110, the guide information is inputted thereto from communication terminal device 130 through memory card 9 or communication interface 16.

Moreover, digital camera 1b is designed in such a manner that a communication control unit 55 in a microcomputer 50 connects digital camera 1b to information supplying device 110 in a state so as to mutually exchange data with each other so that it is allowed to acquire guide information directly from information supplying device 110 through communication network 101.

Figure 9:
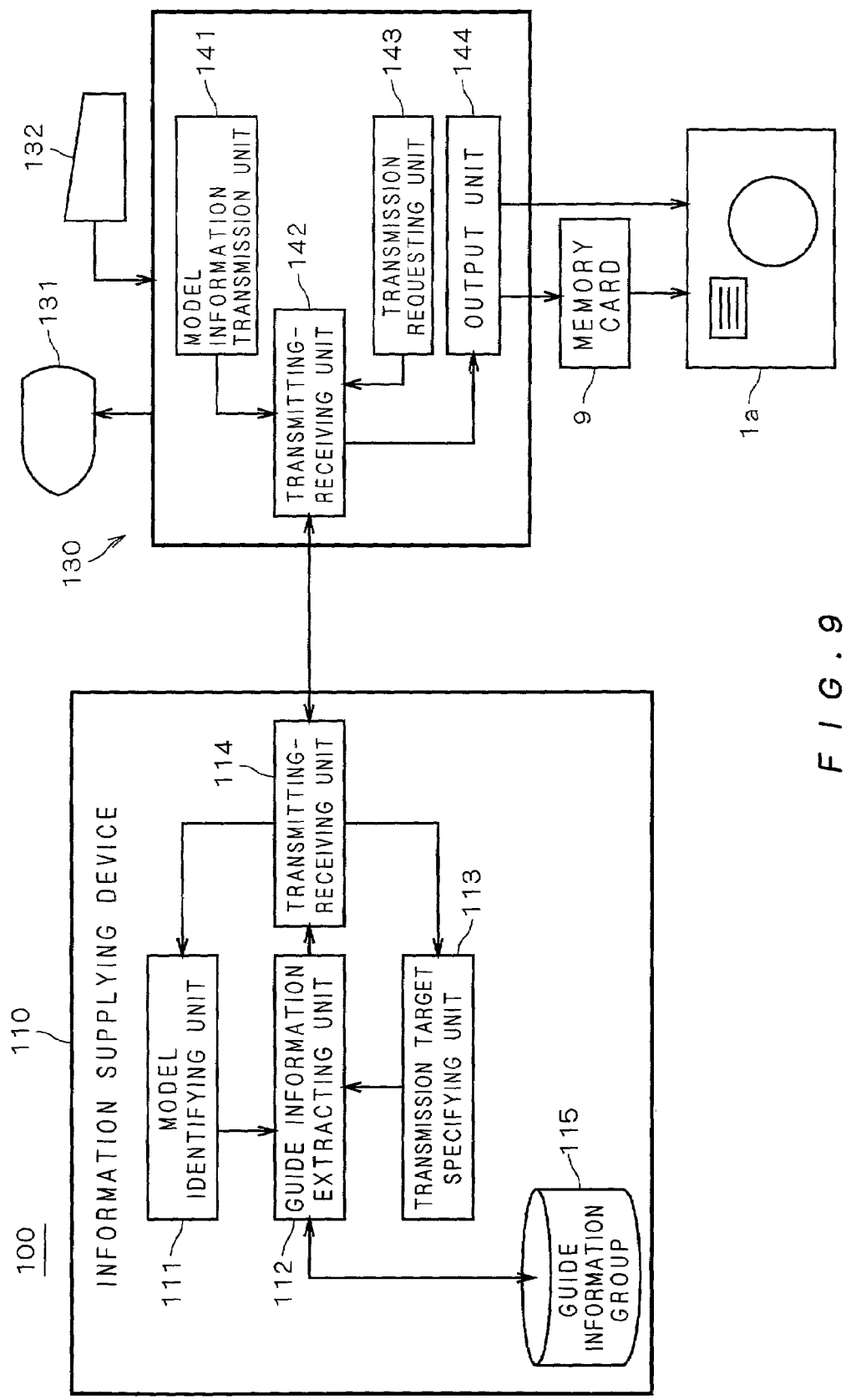
FIG. 9 is a block diagram that shows a construction of the information supplying system for acquiring guide information through a communication terminal device.

FIG. 9 is a block diagram that shows a construction of information supplying system 100 used for acquiring guide information in digital camera 1a.

As shown in FIG. 9, information supplying device 110 is provided with a model identifying unit 111, a guide information extracting unit 112, a transmission target identifying unit 113, a transmitting-receiving unit 114 and a storing unit 115. Moreover, communication terminal device 130 is provided with a display 131, a keyboard 132, a model information transmitting unit 141, a transmitting-receiving unit 142, a transmission requesting unit 143 and an output unit 144. Transmitting-receiving unit 142 of communication terminal device 130 and transmitting-receiving unit 114 of information supplying device 110 are connected to communication network 101 so that they are allowed to transmit and receive data with each other through communication network 101. Moreover, output unit 144 of communication terminal device 130 outputs data to digital camera 1a directly or through memory card 9.

In the case when the user tries to input new guide information to digital camera 1a, he or she makes communication terminal device 130 and information supplying device 110 connected to each other, and inputs model information of digital camera 1a through keyboard 132. The inputting operation of the model information may be made by allowing digital camera 1a to automatically transmit it to communication terminal device 130 when digital camera 1a is directly connected to communication terminal device 130.

Thus, model information transmitting unit 141 is allowed to function in communication terminal device 130 so that the inputted model information is given to transmitting-receiving unit 142. Transmitting-receiving unit 142 transmits the inputted model information to information supplying device 110.

Upon receipt of the model information, transmitting-receiving unit 114 in information supplying device 110 gives the model information to model identifying unit 111. Based upon the model information thus received, model identifying unit 111 identifies the model of digital camera 1a, and gives the results of identification to guide information extracting unit 112. Guide information extracting unit 112 is designed to be freely accessible to storing unit 115. Here, although storing unit 115 stores a plurality of guide information groups, all the guide information groups are not applied to all digital cameras since settable parameters, etc. are different depending on models of digital cameras. For this reason, information indicating which model of digital camera the corresponding information group belongs to is added to each guide information group, and this is stored in the storing unit 115.

Guide information extracting unit 112 makes an access to storing unit 115 to specify the guide information group suitable for the model of digital camera 1a from a plurality of guide information groups. Then, guide information extracting unit 112 generates displaying image data that indicates which theme the specified guide information group is related to (for example, icon images, etc. relating to the theme), and this data is transmitted from transmitting-receiving unit 114 to communication terminal device 130.

Figure 10:
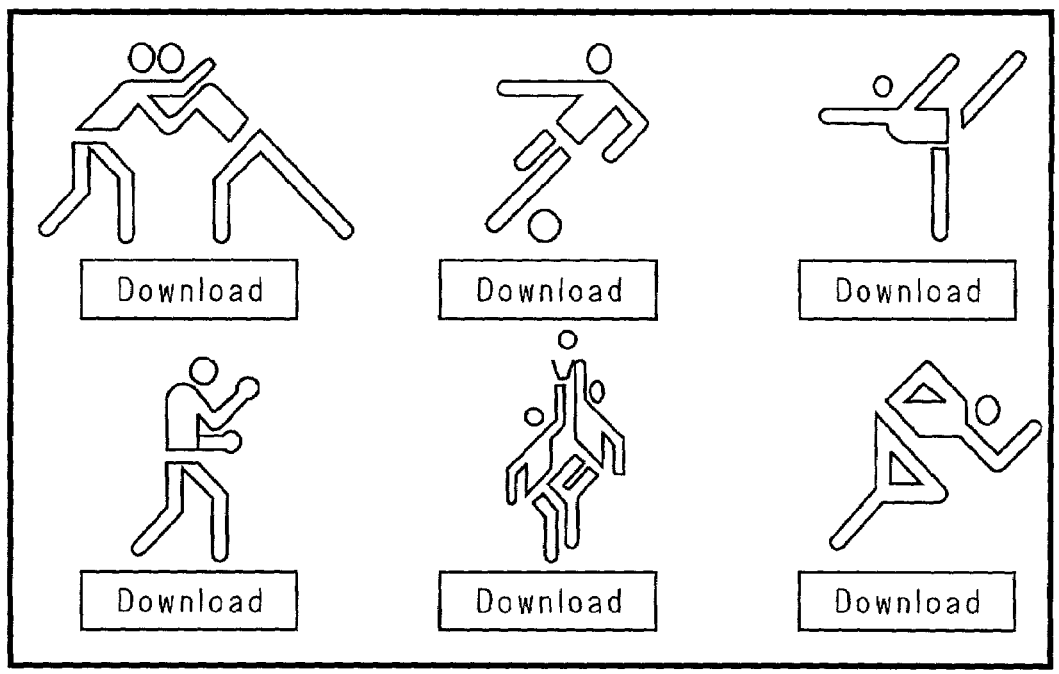
FIG. 10 is a drawing that shows a display screen in a display of the communication terminal device.
Figure 11:
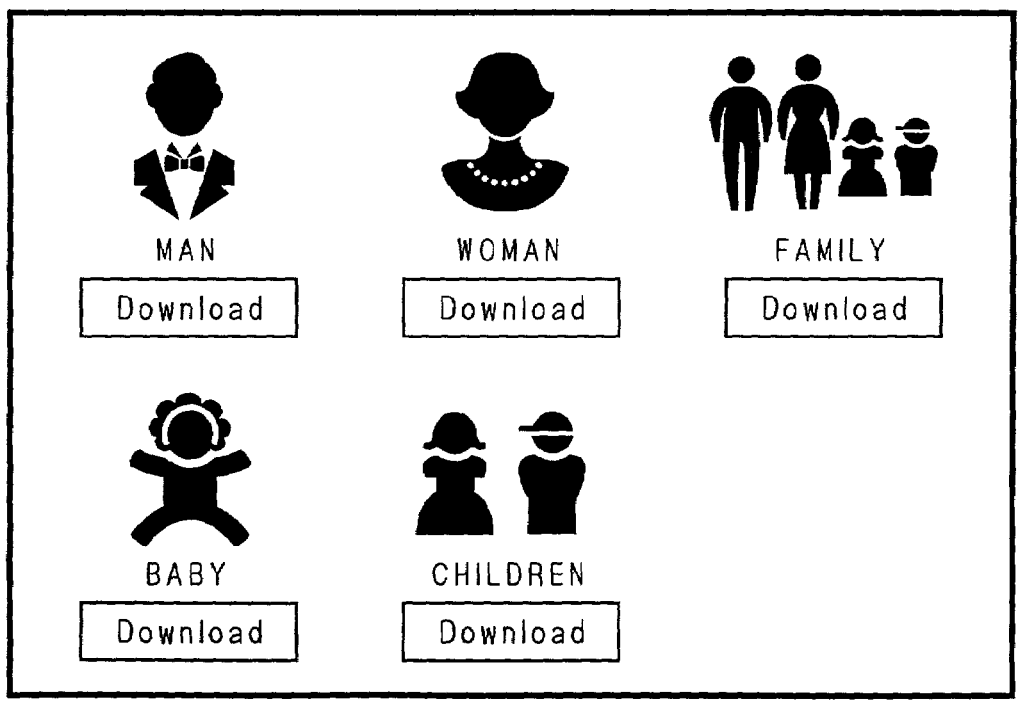
FIG. 11 is a drawing that shows a display screen in a display of the communication terminal device.

Upon receipt of the displaying image data, communication terminal device 130 displays an image based upon the image data on display 131. FIGS. 10 and 11 are drawings that show display screens on display 131. FIG. 10 is a display image that shows what themes the guide information groups relating to framing techniques are based upon, and FIG. 11 is a display image that shows which subjects the guide information groups relating to image-pickup techniques respectively deal with. As shown in FIG. 10 and FIG. 11, an image, which includes images indicating what contents the respective guide information groups have, is schematically displayed on display 131 so that the user is allowed to easily specify a desired guide information group. The user specifies a guide information group to be taken in digital camera 1a by operating keyboard 132. This specifying operation allows transmission requesting unit 143 to function and to send a transmission request for the guide information group to information supplying device 110 through transmitting-receiving unit 142.

In information supplying device 110, transmission target specifying unit 113 is allowed to function to specify the guide information group corresponding to the transmission request from a plurality of guide information groups stored in storing unit 115. Then, the results of the specifying operation are given to guide information extracting unit 112. Guide information extracting unit 112 makes an access to storing unit 115 to read the guide information group corresponding to the transmission request, and processes the guide information group in accordance with the model of digital camera 1a. This processing operation is carried out so as to make, for example, the resolution, used colors, image-pickup mode information, etc. of sample images coincident with the model of digital camera 1a. Guide information extracting unit 112 gives the guide information group thus processed to transmitting-receiving unit 114 so as to send it to communication terminal device 130. Consequently, the communication terminal device 130 is allowed to acquire the guide information group desired by the user.

In communication terminal device 130, output unit 144 is allowed to function so that the guide information group received from information supplying device 110 is recorded in memory card 9 or directly outputted to the cable-connected digital camera 1a. Digital camera 1a is allowed to acquire the guide information group through memory card 9 or directly from the cable connected communication terminal device 130 so that the acquired guide information group is stored in memory 48.

In this manner, digital camera 1a can download and acquire the guide information related to framing techniques and the guide information related to image-pickup techniques from information supplying device 110. Therefore, it is not necessary to preliminarily store a number of pieces of guide information in a memory 48. In particular, in the case when, for example, communication terminal device 130 is provided as a mobile telephone, etc., the user can download the guide information group at the image-pickup place; therefore, the resulting effect is that, even when the user finds that appropriate guide information does not exist inside digital camera 1a, the appropriate guide information is available by downloading it at the same place.

Figure 12:
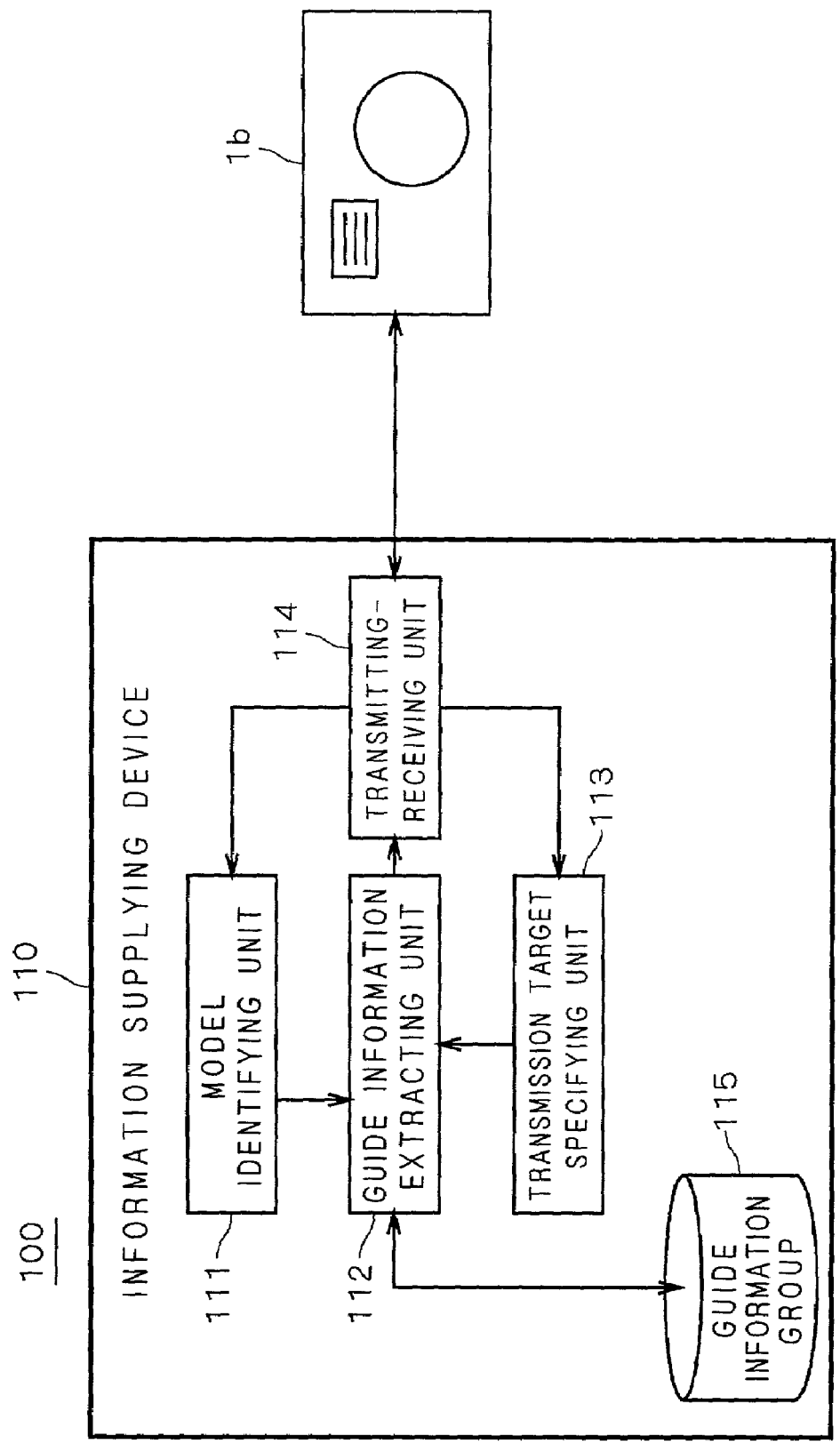
FIG. 12 is a block diagram that shows a construction of an information supplying system through which the digital camera directly acquires guide information.

Next, FIG. 12 is a block diagram that shows the construction of information supplying system 100 used for acquiring guide information in digital camera 1b.

As shown in FIG. 12, in the same manner as FIG. 9, information supplying device 110 is provided with a model identifying unit 111, a guide information extracting unit 112, a transmission target specifying unit 113, a transmitting-receiving unit 114 and a storing unit 115. In this structural example, a communication network 101 is directly connected to communication interface 16 of digital camera 1b. In other words, a communication control unit 55 of digital camera 1b has a function for transmitting and receiving data to and from information supplying device 110 through communication network 101, such as the Internet, public network like telephone lines and local area networks, so that digital camera 1b is allowed to receive guide information group from information supplying device 110 through communication network 101.

In an attempt to input new guide information to digital camera 1a, the user makes digital camera 1b and information supplying device 110 in connection with each other, and inputs the model information of digital camera 1a through operation input unit 60. Thus, inputted model information is given to information supplying device 110. Here, when digital camera 1b and information supplying device 110 are made in connection with each other, communication control unit 55 may automatically transmit the model information of digital camera 1b to information supplying device 110.

Upon receipt of the model information, transmitting-receiving unit 114 in information supplying device 110 gives the model information to model identifying unit 111. Based upon the model information thus received, model identifying unit 111 identifies the model of digital camera 1b, and gives the results of identification to guide information extracting unit 112. Guide information extracting unit 112 is designed to be freely accessible to storing unit 115. Here, as described above, storing unit 115 has stored a plurality of guide information groups for each of the models of digital cameras.

Guide information extracting unit 112 makes an access to storing unit 115 to specify the guide information group suitable for the model of digital camera 1b from a plurality of guide information groups. Then, guide information extracting unit 112 generates displaying image data that indicates which theme the specified guide information group is related to (for example, icon images, etc. relating to the theme), and this data is transmitted from transmitting-receiving unit 114 to digital camera 1b.

Upon receipt of the displaying image data, digital camera 1b displays an image based upon the image data. The display screens, given here, are the same as those shown in FIGS. 10 and 11. Then, the user specifies a guide information group to be taken in digital camera 1b by operating touch panel sensor 17. Based upon this specifying operation, digital camera 1b makes a transmission request for guide information group to information supplying device 110.

In information supplying device 110, transmission target specifying unit 113 is allowed to function to specify the guide information group corresponding to the transmission request from a plurality of guide information groups stored in storing unit 115. Then, the results of the specifying operation are given to guide information extracting unit 112. Guide information extracting unit 112 makes an access to storing unit 115 to read the guide information group corresponding to the transmission request, and gives it to transmitting-receiving unit 114 so as to be transmitted to digital camera 1b. Consequently, digital camera 1b is allowed to receive guide information group desired by the user, and the inputted guide information group is stored in memory 48.

In this manner, digital camera 1b can also download and acquire the guide information related to framing techniques and the guide information related to image-pickup techniques from information supplying device 110. Therefore, it is not necessary to preliminarily store a number of pieces of guide information in a memory 48. In particular, since this system construction eliminates the necessity of interpolated communication terminal device 130, the resulting effect is that the guide information group desired by the user can be downloaded through a comparatively simple operation.

Figure 13:
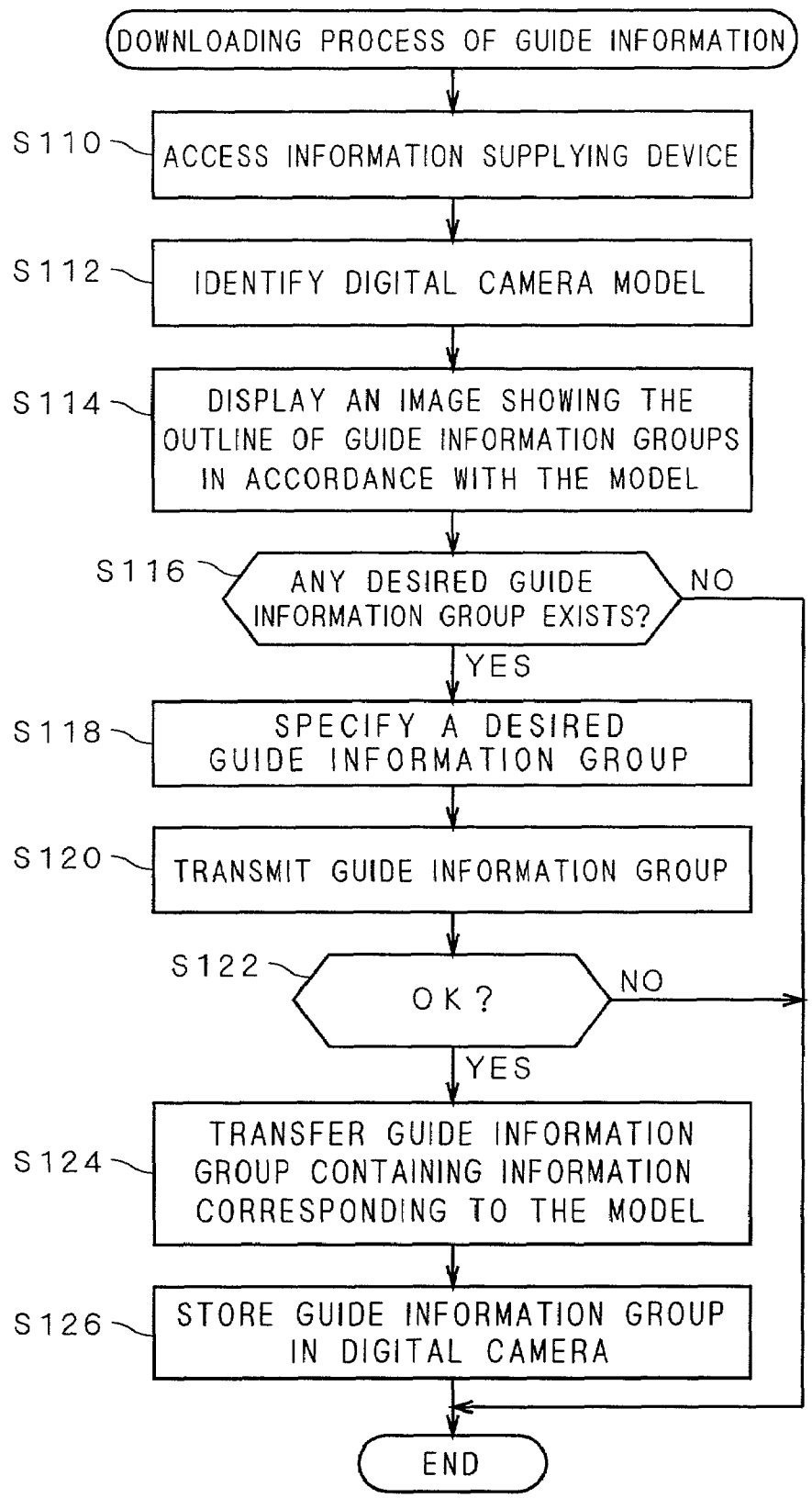
FIG. 13 is a flow chart that shows downloading processes of guide information.

An explanation will be given of such downloading processes in accordance with the sequence thereof. FIG. 13 is a flow chart that shows the downloading processes of guide information.

First, the user makes an access to information supplying device 110 from communication terminal device 130 or digital camera 1 through communication network 101 (step S110). Here, information supplying device 110 identifies the model of digital camera 1 (step S112). Next, information supplying device 110 transmits an image schematically indicating guide information groups in accordance with the model to communication terminal device 130 or digital camera 1, and upon receipt of the image, communication terminal device 130 or digital camera 1 displays the image (step S114). Consequently, the image shown in FIG. 10 and FIG. 11 are displayed on display 131 of communication terminal device 130 or liquid crystal display 3 of digital camera 1.

Next, the user makes a determination as to whether or not the desired guide information group exists in the displayed image (step S116), and if the desired guide information group is included, the user specifies the desired guide information group (step S118). In contrast, if no desired guide information group exists, the downloading process is completed.

If the desired guide information group has been specified by the user, communication terminal device 130 or digital camera 1 transmits pieces of information related to the specified guide information group to information supplying device 110 (step S120). In this case, when the user desires a plurality of guide information groups, he or she continuously operates touch panel sensor 17 so that communication terminal device 130 or digital camera 1 transmits pieces of information related to the plurality of guide information groups desired by the user to information supplying device 110. If the guide information groups specified by the user are exactly the guide information groups desired by the user, the user carries out a predetermined operation so that the specified guide information groups are subjected to a transferring process (step S122). In contrast, if the user does not carry out the predetermined operation, the downloading process is completed.

Information supplying device 110 transmits the guide information groups that have been specified by the user and that also include pieces of information corresponding to the model to communication terminal device 130 or digital camera 1 (step S124). Then, communication terminal device 130 or digital camera 1 stores the guide information groups inputted from information supplying device 110 in memory 48, thereby completing the downloading process (step S126).

<4. Image-Pickup Operation by a Digital Camera>

Figure 14:
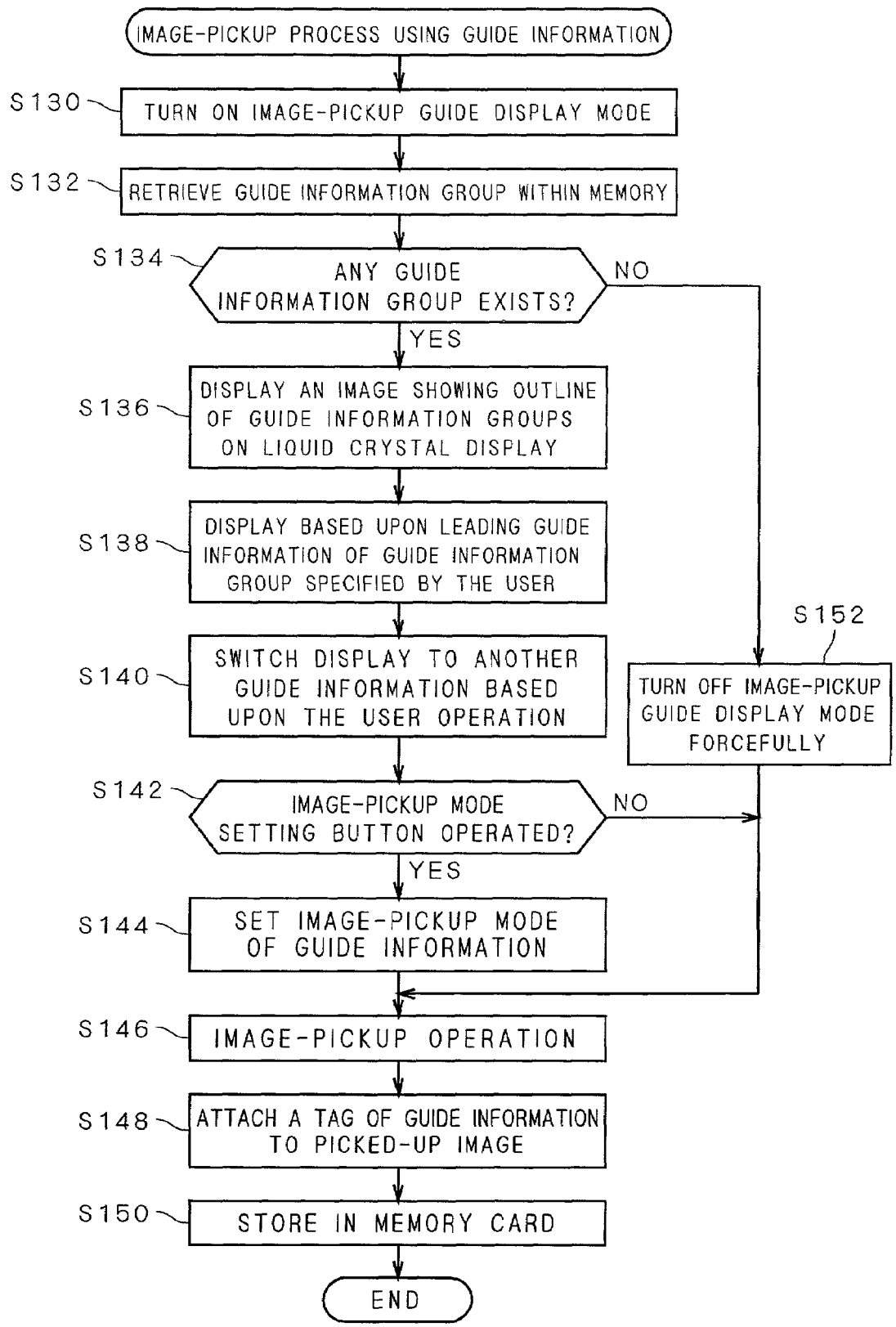
FIG. 14 is a flow chart that shows an image-pickup process using the guide information.

Next, an explanation will be given of a case in which an image-pickup process is carried out by using guide information in digital camera 1. FIG. 14 shows a flow chart that indicates image-pickup processes using guide information.

In the case when the user carries out an image-pickup operation by using guide information, he or she operates display mode operation unit 18 so that the image-pickup guide display mode of digital camera 1 is switched on (step S130). Then, guide information display control unit 51 of microcomputer 50 in digital camera 1 is allowed to function so that a retrieving process is carried out on the guide information groups stored in memory 48 (step S132). When any guide information group exists in memory 48, guide information display control unit 51 allows the sequence to proceed to step S136 (step S134). In contrast, when no guide information group exists in memory 48, the sequence proceeds to step S152 where the image-pickup guide display mode is forcefully turned off since no guide information is displayed, thereby allowing the sequence to proceed to step S146 so as to carry out a normal image-pickup operation.

Figure 15:
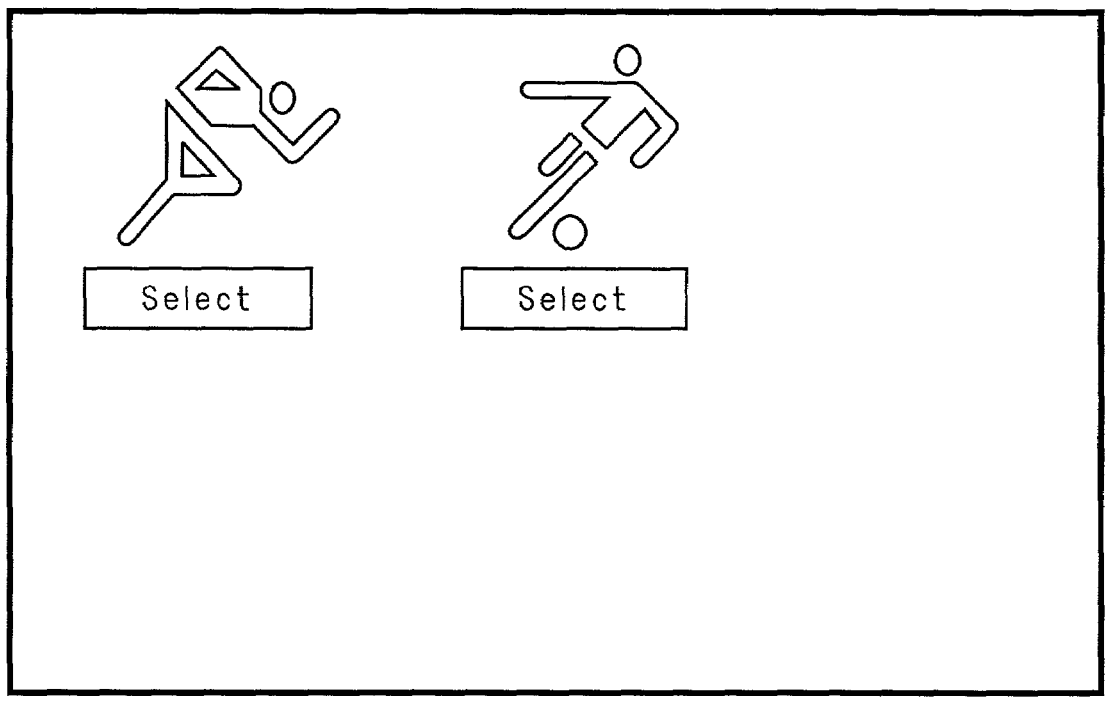
FIG. 15 is a drawing that shows an image showing the outline of guide information groups displayed on a liquid crystal display.

In the case when any guide information group exists in memory 48, guide information display control unit 51 displays an image that indicates the outline of guide information groups on liquid crystal display 3 (step S136). For example, icon displays, etc., given based upon respective themes, etc. for the respective guide information groups, are given. FIG. 15 is a drawing that shows an image that indicates the outline of the guide information groups displayed on liquid crystal display 3. As shown in FIG. 15, among images displayed on liquid crystal display 3, selection buttons are displayed at lower positions of icon displays corresponding to the guide information groups, and when the user specifies a guide information group to be used at the time of an image-pickup operation, he or she can only operate touch panel sensor 17 on each of these selection button displays.

When the user specifies a guide information group, guide information display control unit 51 extracts the specified guide information group from memory 48, and displays the leading guide information of the guide information group on liquid crystal display 3 (step S138). At this time, in accordance with the setting position (upper stage position or middle stage position) of a switch 18a of image-pickup guide display mode operation unit 18, guide information display control unit 51 displays the guide information in full screen on liquid display 3 or in only one area on liquid crystal display 3.

Figure 16:
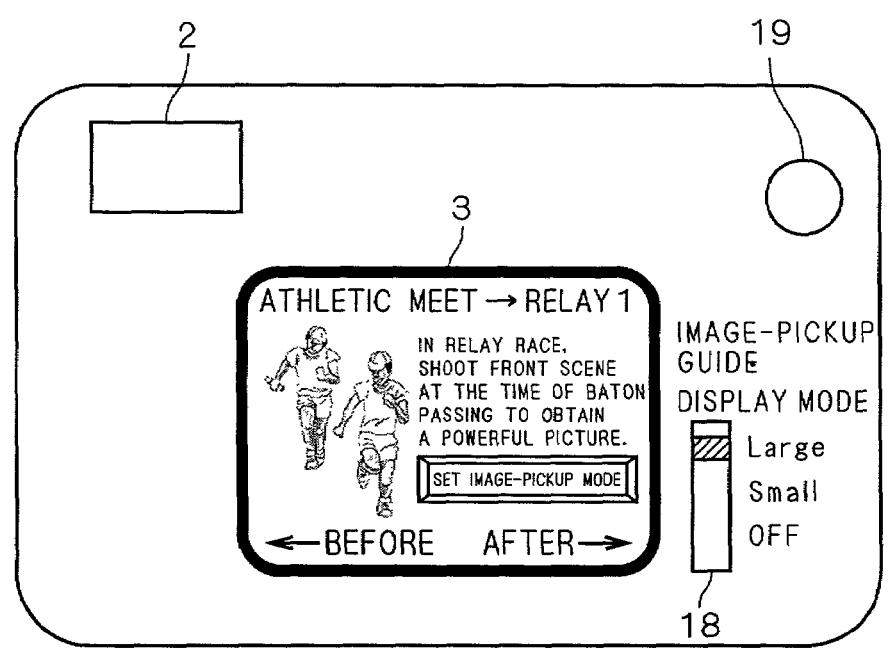
FIG. 16 is a drawing that shows a state in which guide information relating to framing techniques is full-screen displayed on the liquid crystal display.

FIG. 16 is a drawing that shows a state in which the guide information relating to framing techniques is displayed in full screen on liquid crystal display 3. As shown in FIG. 16, when the user picks up an image of a subject, the guide information is displayed on liquid crystal display 3 so that the user is allowed to easily find how to appropriately carry out a framing on the subject, thereby making it possible to reduce failure in framing at the time of picking up an image.

Figure 17:
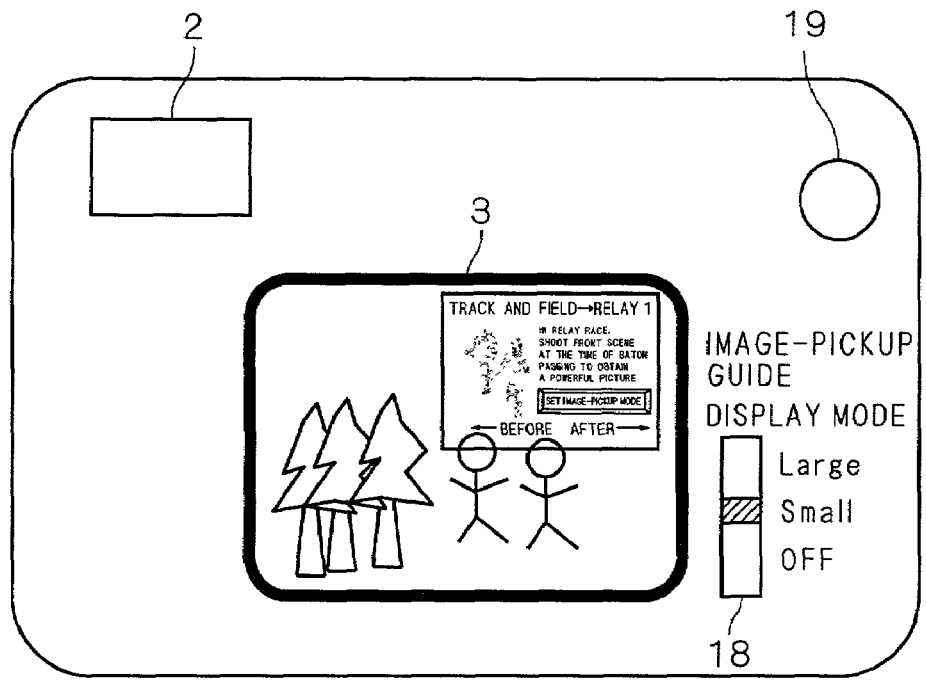
FIG. 17 is a drawing that shows a state in which guide information relating to framing techniques is displayed at only one area of the liquid crystal display.

Moreover, FIG. 17 is a drawing that shows a state in which the guide information relating to framing techniques is displayed at one area on liquid crystal display 3 while the guide information and a live-view image are over-lay displayed thereon. In other words, in this example, when switch 18a of image-pickup guide display mode operation unit 18 is set in the middle stage position, the guide information is displayed with a small size in an over-laid state on a live-view image. By providing this type of display, the user is allowed to pick up an image while comparing the image to be actually picked up and the sample image at the same time upon picking up an image, thereby making it possible to reduce a failure in framing at the time of picking up an image.

Figure 18:
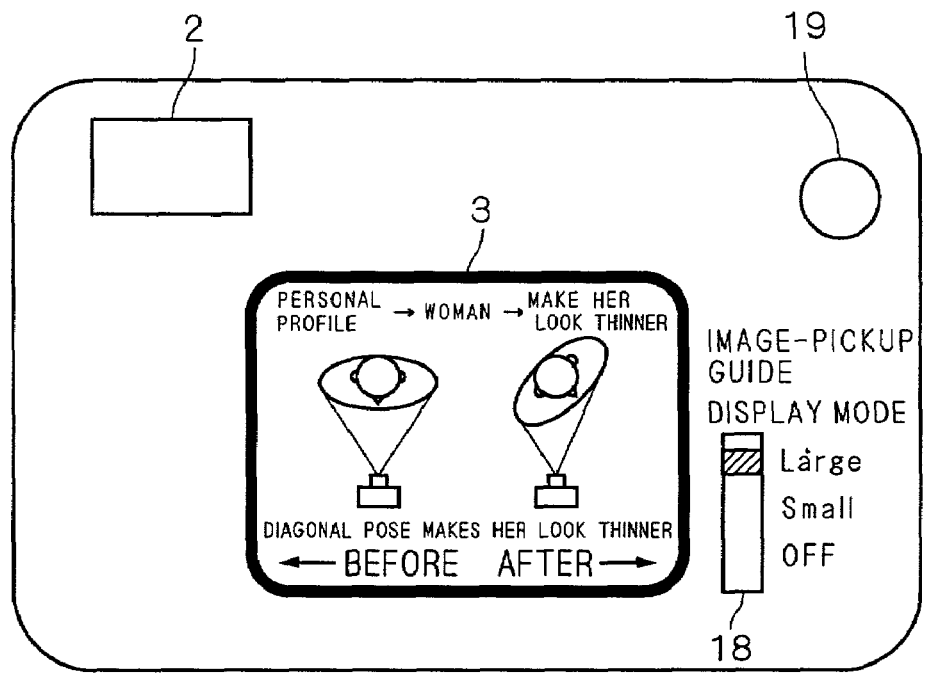
FIG. 18 is a drawing that shows a state in which guide information relating to image-pickup techniques is full-screen displayed on the liquid crystal display.

Next, FIG. 18 is a drawing that shows a state in which the guide information relating to image-pickup techniques is displayed in full screen on liquid crystal display 3. As shown in FIG. 18, by displaying the guide information when the user picks up an image of a subject, the user is allowed to easily find how to place the subject or what posture the subject should take, thereby making it possible to reduce a failure in picking up an image.

Figure 19:
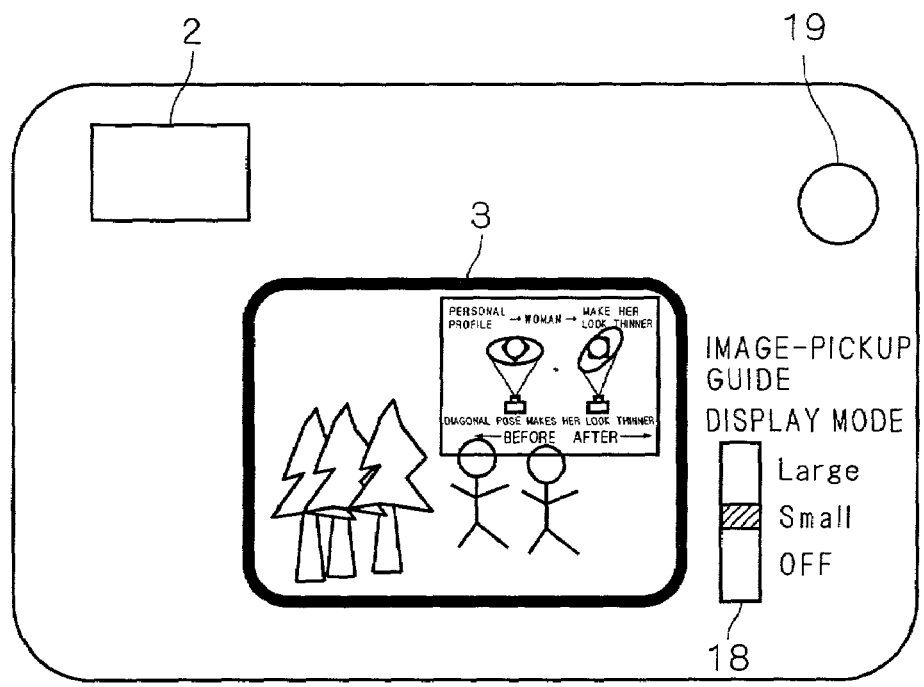
FIG. 19 is a drawing that shows a state in which guide information relating to image-pickup techniques is displayed at only one area of the liquid crystal display.

Moreover, FIG. 19 is a drawing that shows a state in which the guide information relating to image-pickup techniques is displayed at one area on liquid crystal display 3 while the guide information and a live-view image are over-lay displayed thereon. In other words, in this example also, when switch 18a of image-pickup guide display mode operation unit 18 is set in the middle stage position, the guide information is displayed with a small size in an over-laid state on a live-view image. By providing this type of display, the user is allowed to pick up an image while comparing the image to be actually picked up and the sample image at the same time upon picking up an image, thereby making it possible to reduce a failure in framing at the time of picking up an image.

Figure 20:
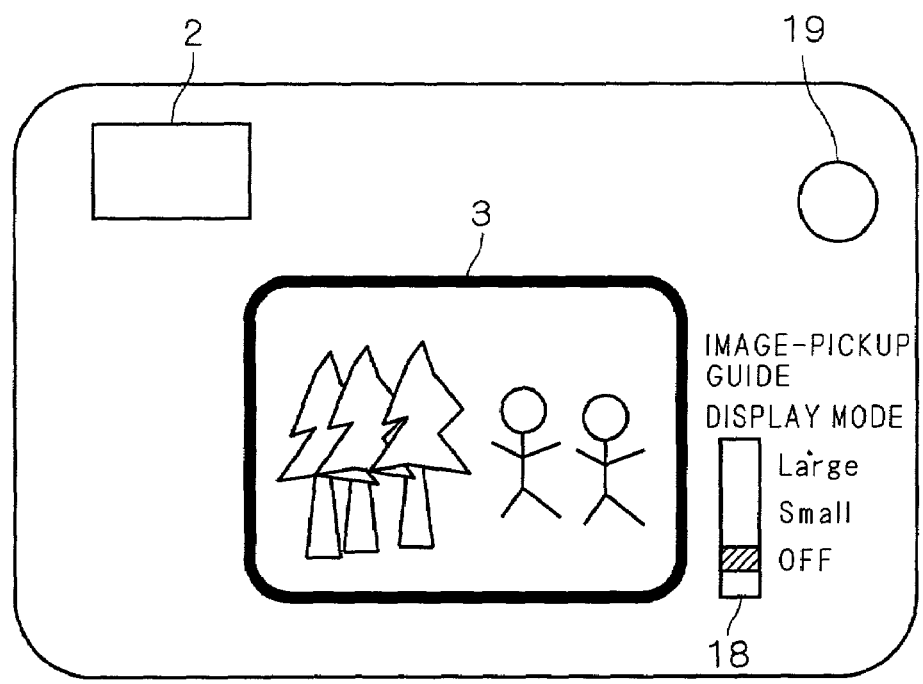
FIG. 20 is a drawing that shows a display state of the liquid crystal display in the case when an image-pickup guide mode is switched off.

Here, FIG. 20 is a drawing that shows a display state on liquid crystal display 3 in the case when the image-pickup guide display mode is switched off, and that is the same display state as the conventional image-pickup time. When the user has switched the image-pickup guide display mode off, or when no guide information exists in memory 48, the display state as shown in FIG. 20 is given, thereby providing a normal image-pickup mode in the same manner as the conventional device.

When the image-pickup guide display mode is on with the above-mentioned guide information being displayed on liquid crystal display 3, and when no guide information desired by the user is displayed, the user is allowed to change the displayed guide information to another guide information by operating touch panel sensors 17 corresponding to the positions of "←before" and "after→" (step S140). At this time, guide information display control unit 51 is allowed to function as a selection means so that another guide information is read based upon link information LD1, LD2 contained in the guide information, and by supplying this to liquid crystal display 3, the displayed image is updated.

Then, guide information display control unit 51 makes a determination as to whether or not touch panel sensor 17 corresponding to the display position of the image-pickup mode setting button is operated (step S142), and if operated, it automatically sets the image-pickup mode to one of the macro mode, person mode and sport mode, based upon image-pickup mode information MD1, MD2 contained in the guide information (step S155).

As a result, the image-pickup parameters at the time of picking up an image are also automatically set. For example, when the sport mode is set, the shutter speed is set at a speed higher than a normal value, the auto-focusing function is set to a continuous system, the photometric system is fixed to a division photometric system, and the white balance is set to automatic mode.

In contrast, in the case when the image-pickup mode setting button is not operated, the sequence proceeds to step S146 without automatically setting the image-pickup mode.

At step S146, an image-pickup operation is carried out. Through this image-pickup operation, a recording image is picked up. The image, obtained by CCD image-pickup elements 40 under control of microcomputer 50, is subjected to a predetermined image processing and an image compression such as JPEG, etc.

Tag information relating to guide information used (displayed) at the time of picking up an image is added to the resulting picked-up image (step S148). FIG. 21 is a drawing that shows a data structure of the picked-up image (image file). As shown in FIG. 21, to the image data that has been subjected to an image processing at the first image processing unit 53, tag information including ID information of the guide information used at the time of picking up an image is added so as to generate the data of the picked-up image. By adding such tag information to the image data, it is possible to confirm the guide information used at the time of picking up the image; therefore, without the necessity of identifying the contents of the image, it becomes possible to identify what subject the user has picked up an image of based upon the tag information. Therefore, as will be described later, this tag information becomes useful in the case when a decorative processing (art work), an image processing and the like are applied to the picked-up image in accordance with the kind of the subject picked up by the user.

Then, image recording control unit 52 of microcomputer 50 is allowed to function so that the data of the picked-up image (image file) to which the tag information has been added is recorded in memory card 9 (step S150), thereby completing an image-pickup operation.

In this manner, when an image is picked up by using digital camera 1, guide information suitable for a subject is displayed on demand from the user; therefore, it is possible to reduce a failure in framing, etc. to a minimum at the time of picking up an image.

<5. Image Processing by the use of Tag Information>

Next, an explanation will be given of an image processing by the use of tag information. The image processing by the use of tag information may be carried out on a digital camera 1 or on an information supplying device 110.

Figure 22:
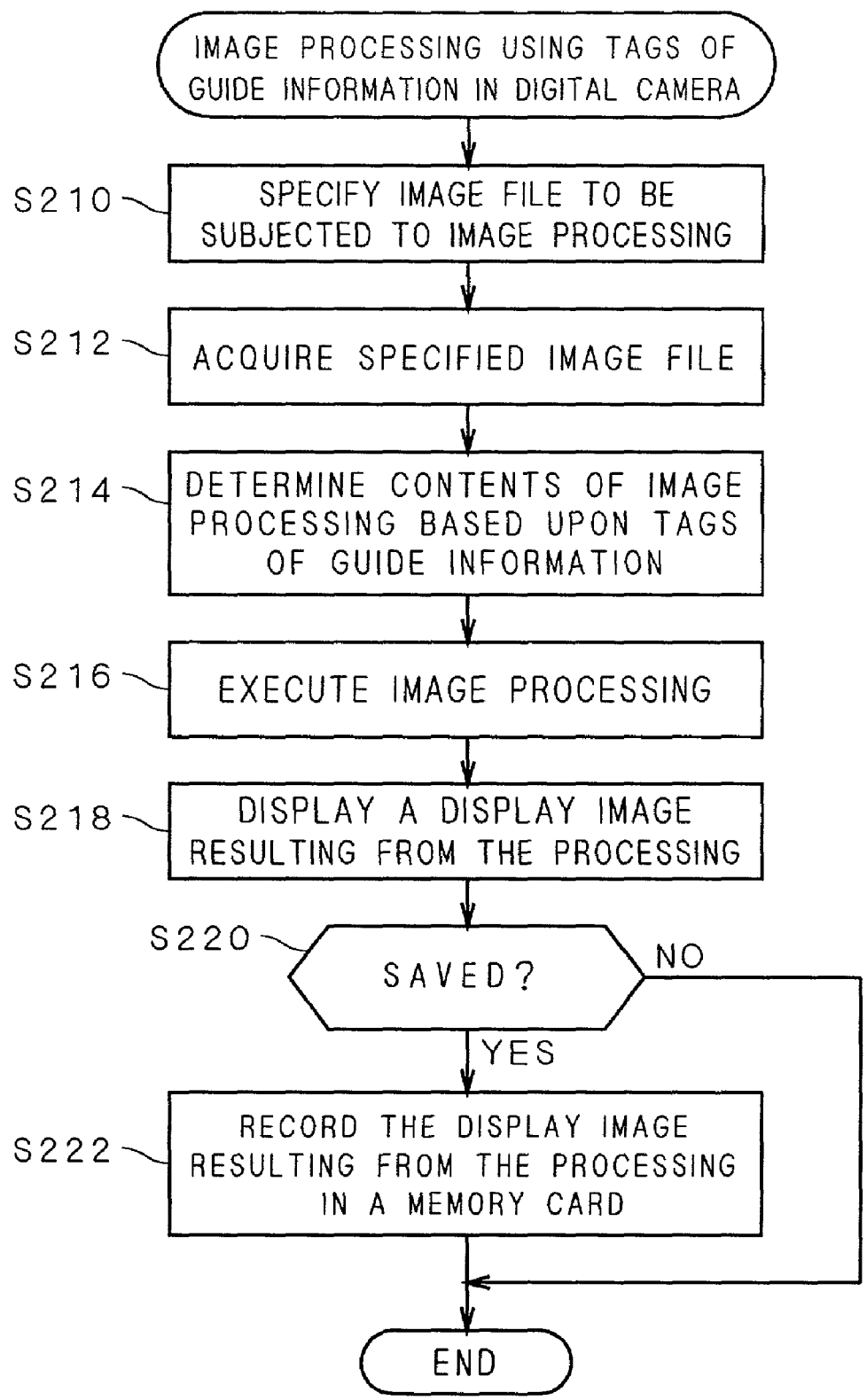
FIG. 22 is a flow chart of image processing in which tag information of guide information is used in a digital camera.

Here, an explanation will be given of a case in which an image processing by the use of tag information is carried out on digital camera 1. FIG. 22 is a flow chart that shows an image processing by the use of tag information of guide information in digital camera 1.

First, in microcomputer 50 of digital camera 1, a second image processing unit 54 is allowed to function. The second image processing unit 54 receives a specified file to be subjected to an image processing from the user (step S210). When the user has specified an image file to be subjected to an image processing, the second image processing unit 54 acquires the specified image file from image files recorded in memory card 9 (step S212).

Then, the second image processing unit 54 specifies the guide information used at the time of picking up the image based upon the tag information contained in the image file, and based upon the guide information, determines the contents of the image processing (step S214). For example, when the guide information is information relating to "relay race", a sharp processing is selected as the contents of processing. When the sharp processing is carried out on the image derived from "relay race", an energetic image is obtained. Moreover, for example, when the guide information is information relating to "dusk scenes", a processing is carried out so as to make dusk scenes vivid by increasing the rate of red-color components in the image. Here, in the case when no ID information of guide information is included in the tag information in the image file, the image processing is completed.

Thus, the second image processing unit 54 carries out the determined image processing on the image data contained in the specified image file (step S216). For example, in the case when the sharp processing has been selected as the contents of the image processing, the sharp processing is carried out on the image data. Upon completion of the image processing, the second image processing unit 54 displays the resulting image on liquid crystal display 3 (step S218). This display allows the user to visually confirm the results of the image processing that has been carried out automatically in accordance with the situation at which the image was picked up. Then, the user makes an input as to whether or not the resulting image is stored (step S220), and when this is stored, the sequence proceeds to step S222 where the image that has been subjected to the image processing is stored in memory card 9 (step S222). Here, if this is not stored, the sequence of processes is completed.

In this manner, by carrying out an image processing based upon guide information used at the time of picking up the image in a digital camera, it becomes possible to automatically carry out the image processing in accordance with the situation of the subject.

Figure 23:
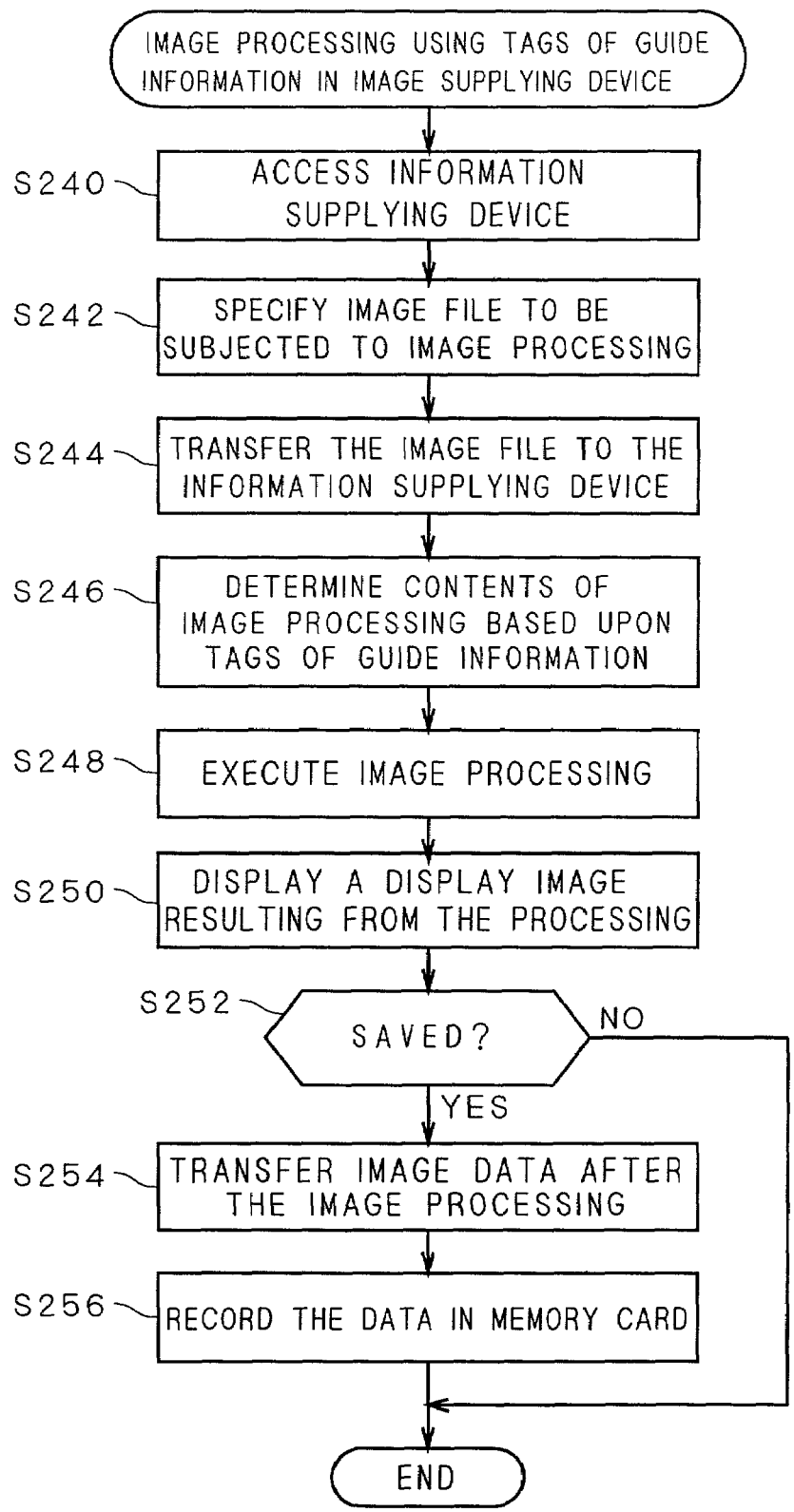
FIG. 23 is a flow chart of image processing in which tag information of guide information is used in a digital camera.

Next, an explanation will be given of a case in which an image processing is carried out by using tag information in information supplying device 110. FIG. 23 is a flow chart of an image processing that is carried out by using tag information of guide information in digital camera 1.

First, information supplying device 110 is accessed through communication network 101 directly from digital camera 1 or from communication terminal device 130 (step S240). In the case of accessing from communication terminal device 130, the accessing process may be made in a state in which only the memory card 9 having a recorded image file has been removed from digital camera 1 and attached to communication terminal device 130.

The user specifies an image file to be subjected to an image processing among image files recorded in memory card 9 (step S242). Communication control unit 55 of digital camera 1 or communication terminal device 130 extracts the specified image file from memory card 9, and transfers this to information supplying device 10.

Information supplying device 110 reads tag information of guide information from the received image file, and specifies the guide information used at the time of picking up the image based upon the tag information. Then, the contents of image processing are determined based upon the guide information (step S246). For example, in the case when the guide information is information relating to "relay race", the contents of processing are determined as processes such as a process for emphasizing perspective and a process for setting a subject in a laterally blurred state.

In general, the data processing capability of information supplying device 110 is higher than the data processing capability of digital camera 1, and with respect to an image processing that would cause a great reduction in the processing efficiency by the application of the image processing capability of digital camera 1, such as image processing is preferably carried out in information supplying device 110. In other words, it is preferable to design information supplying device 110 so as to carry out an image processing that has a processing load greater than that of the image processing carried out by digital camera 1.

Here, in this case also, no ID information of guide information is contained in tag information of an image file, the image processing is completed.

Then, information supplying device 110 executes the determined image processing on the image data contained in the received image file (step S248).

Upon completion of the image processing, information supplying device 110 transmits a displaying image for displaying the results of processing to digital camera 1 or communication terminal device 130. Then, digital camera 1 or communication terminal device 130 displays the received displaying image (step S250). With this display, the user is allowed to visually confirm the results of the image processing that has been carried out automatically in information supplying device 110. Then, the user makes an input as to whether or not the resulting image is stored (step S252), and when this is stored, the sequence proceeds to step S254. In contrast, if this is not stored, the sequence of processes is completed.

In the case when the image is stored, information supplying device 110 transmits the image data having been image-processed (image file) to digital camera 1 or communication terminal device 130 (step S254). Digital camera 1 or communication terminal device 130 records the received image data in memory card 9 (step S256).

By carrying out the image processing based upon the guide information used at the time of the image pickup in the digital camera, it is possible to automatically carry out an image processing in accordance with the situation of a subject.

Here, an explanation has been given of only the image processing; however, in the case when ID information of guide information is contained in tag information, not only the image processing in accordance with a subject, but also various kinds of other processing may be carried out. For example, such a process for generating music in accordance with the situation of a subject at the time of picking up the image may be provided.

<6. Modified Example>

Explanations have been given of preferred embodiments of the present invention; however, the present invention is not intended to be limited by the contents of the above description.

For example, the above description has exemplified a digital camera as an image-pickup device; however, the present invention may be applied to video cameras for shooting motion pictures, or silver salt cameras for picking up images by using silver salt films.

Moreover, the above descriptions have exemplified cases in which, in the image-pickup mode, guide information relating to framing techniques or image-pickup techniques that is suitable for the subject is displayed so as to allow the user to visually confirm the guide information; however, the present invention is not intended to be limited by this method, and the guide information may be given so as to allow the user to audibly confirm the guide information. For example, in the case when a digital camera has a voice generation function such as a speaker, etc., voice may be used for informing the user of the guide information. Moreover, even when the guide information is displayed, not only a still image, but also a motion image or a character or the like may be displayed to allow the user to confirm the guide information.

Moreover, the above descriptions have exemplified cases in which guide information is displayed on either one of liquid crystal display 3 and inside finder liquid crystal display 2a; however, the present invention is not intended to be limited by this arrangement, and the guide information may be displayed on both of them. Furthermore, a live-view may be displayed on one of the displays, while the guide information may be displayed on the other display.

While the invention has been described in detail, the foregoing description is in all aspects illustrative and not restrictive. It is understood that numerous other modifications and variations can be devised without departing from the scope of the invention.

What is claimed is:

1. A digital camera, comprising:
   a display;
   a memory adapted to store a plurality of suggestions comprising advice in the form of text and images related to composition of a scene which is to be captured by said digital camera, wherein the suggestions related to composition of a scene are suggestions related to framing the scene which include an example image framed according to the suggestion; and
   a controller adapted to select one of the plurality of suggestions from the memory responsive to a user input and to show the selected suggestion on the display.

2. The digital camera of claim 1, wherein the plurality of suggestions is grouped in the memory according to a type of subject matter being imaged.

3. The digital camera of claim 2, further comprising a user input, wherein the controller is further adapted to select a group of suggestions in the memory and show an indication of the selected group on the display, the selected one of the plurality of suggestions being selected from the selected group of suggestions.

4. The digital camera of claim 2, further comprising an interface adapted to couple to an external device so that a group of suggestions may be selectively received from the external device and stored in the memory.

5. The digital camera of claim 4, wherein a group of suggestions is retrieved from the external device responsive to an indicia of a capability of the digital camera.

6. The digital camera of claim 4, wherein a group of suggestions is retrieved from the external device responsive to a user input.

7. The digital camera of claim 1, wherein the suggestions related to composition of a scene comprise advice on composing the scene so as to improve a subsequently captured image of the scene.

8. A digital camera, comprising:
a display;
a memory adapted to store a plurality of suggestions comprising advice in the form of text and images related to composition of a scene which is to be captured by said digital camera, wherein the suggestions related to composition of a scene are suggestions related to posing a person in the scene which include an example image in which a person is posed according to the suggestion; and
a controller adapted to select one of the plurality of suggestions from the memory responsive to a user input and to show the selected suggestion on the display.

9. The digital camera of claim 8, wherein the plurality of suggestions is grouped in the memory according to a type of subject matter being imaged.

10. The digital camera of claim 9, further comprising a user input, wherein the controller is further adapted to select a group of suggestions in the memory and show an indication of the selected group on the display, the selected one of the plurality of suggestions being selected from the selected group of suggestions.

11. The digital camera of claim 10, further comprising an interface adapted to couple to an external device so that a group of suggestions may be selectively received from the external device and stored in the memory.

12. The digital camera of claim 11, wherein a group of suggestions is retrieved from the external device responsive to an indicia of a capability of the digital camera.

13. The digital camera of claim 11, wherein a group of suggestions is retrieved from the external device responsive to a user input.

14. An information supplying device, which is capable of exchanging data with an image-pickup device through a cable or radio or a predetermined recording medium, comprising:
a storing unit which stores a plurality of kinds of guide information for respective models of said image-pickup device, said guide information being related to framing techniques or image-pickup techniques suitable for a subject, used at the time of picking up an image by using said image-pickup device;
a model identifying unit which identifies a model of said image-pickup device that is capable of exchanging data with said information supplying device at the time of transmitting said guide information;
a guide information extracting unit which extracts said guide information from said storing unit based upon the model of said image-pickup device that has been identified by said model identifying unit; and
a transmitting unit for transmitting said guide information extracted by said guide information extracting unit to said image-pickup device.

* * * * *